(12) United States Patent
Kodama et al.

(10) Patent No.: US 8,845,194 B2
(45) Date of Patent: Sep. 30, 2014

(54) ROTARY DEVICE

(71) Applicant: Samsung Electro-Mechanics Japan Advanced Technology Co., Ltd., Shizuoka (JP)

(72) Inventors: Mitsuo Kodama, Shizuoka (JP); Ryusuke Sugiki, Shizuoka (JP)

(73) Assignee: Samsung Electro-Mechanics Japan Advanced Technology Co., Ltd., Shizuoka (JP)

(*) Notice: Subject to any disclaimer, the term of this patent is extended or adjusted under 35 U.S.C. 154(b) by 0 days.

(21) Appl. No.: 13/895,512

(22) Filed: May 16, 2013

(65) Prior Publication Data

US 2014/0056548 A1 Feb. 27, 2014

(30) Foreign Application Priority Data

Aug. 23, 2012 (JP) ................. 2012-184302

(51) Int. Cl.

| | |
|---|---|
| *F16C 33/72* | (2006.01) |
| *F16C 32/06* | (2006.01) |
| *H02K 7/08* | (2006.01) |
| *F16C 17/10* | (2006.01) |
| *F16C 33/10* | (2006.01) |
| *G11B 19/20* | (2006.01) |
| *F16C 33/74* | (2006.01) |

(52) U.S. Cl.
CPC .............. *F16C 32/064* (2013.01); *H02K 7/086* (2013.01); *F16C 2370/12* (2013.01); *F16C 17/107* (2013.01); *F16C 33/103* (2013.01); *G11B 19/2009* (2013.01); *F16C 2240/94* (2013.01); *F16C 33/745* (2013.01)
USPC .......................................... 384/119; 384/107

(58) Field of Classification Search
USPC ........ 384/107, 119; 310/90; 360/99.08, 98.07
See application file for complete search history.

(56) References Cited

U.S. PATENT DOCUMENTS

| | | | |
|---|---|---|---|
| 5,533,811 | A | 7/1996 | Polch et al. |
| 7,982,349 | B2 | 7/2011 | Popov et al. |
| 8,277,125 | B2 | 10/2012 | Kimura et al. |
| 8,337,086 | B2 | 12/2012 | Oe et al. |
| 8,690,435 | B2 * | 4/2014 | Kimura et al. ............... 384/119 |
| 2003/0133633 | A1 * | 7/2003 | Nakamura ................... 384/107 |
| 2006/0222276 | A1 * | 10/2006 | Uenosono .................... 384/107 |
| 2009/0140588 | A1 * | 6/2009 | Drautz et al. .................. 310/90 |
| 2009/0168246 | A1 | 7/2009 | Kainoh et al. |
| 2010/0124387 | A1 * | 5/2010 | Fuss et al. ................... 384/107 |

(Continued)

FOREIGN PATENT DOCUMENTS

| | | |
|---|---|---|
| JP | 2009-162246 | 7/2009 |
| JP | 2010-127448 | 6/2010 |

*Primary Examiner* — Thomas R. Hannon
(74) *Attorney, Agent, or Firm* — IPUSA, PLLC

(57) ABSTRACT

A rotary device includes a fixed body including a shaft; a rotary body including a sleeve being configured to surround the shaft through lubricant; and first and second taper seals provided in a space between the fixed body and the rotary body in which gas-liquid interfaces of the lubricant exist, respectively, when the rotary device is operated, the first and taper seals being configured such that a lower limit of a filling ratio of the second taper seal corresponds to a predetermined range of the filling ratio of the first taper seal including its lower limit of the filling ratio, and an upper limit of the filling ratio of the second taper seal corresponds to a predetermined filling ratio of the first taper seal that is larger than an upper limit of the predetermined range and lower than an upper limit of the first taper seal.

20 Claims, 11 Drawing Sheets

(56) References Cited

U.S. PATENT DOCUMENTS

| | | |
|---|---|---|
| 2010/0277833 A1 | 11/2010 | Sugiki |
| 2012/0090163 A1 | 4/2012 | Kodama et al. |
| 2012/0093446 A1 | 4/2012 | Goto et al. |
| 2012/0183243 A1 | 7/2012 | Sugiki |

* cited by examiner $$\left(F1 \simeq \frac{TV3}{TV1}\right)$$

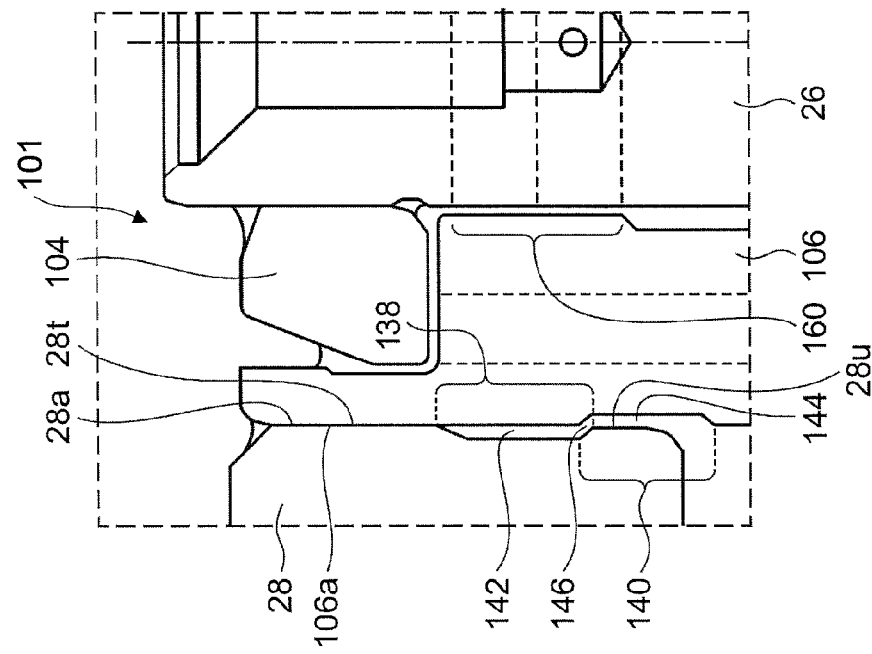
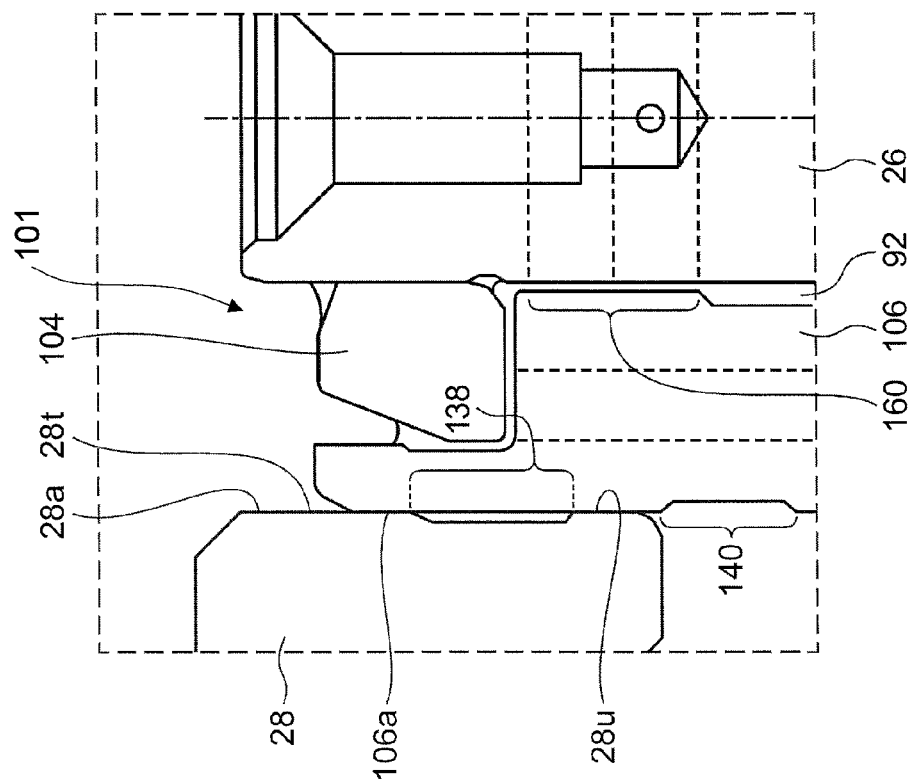
FIG.6A / FIG.6B

ROTARY DEVICE

BACKGROUND OF THE INVENTION

1. Field of the Invention

The present invention relates to rotary devices.

2. Description of the Related Art

Disk drive devices such as hard-disk drives have been mounted in various electronic devices as a result of miniaturization and capacity enlargement. In particular, disk drive devices have been mounted in portable electronic devices such as notebook computers, portable music players or the like. For disk drive devices that are mounted in such portable electronic devices, it is required to improve resistance against shock and resistance against vibration, in order to resist against shock such as falling down or vibration when carrying such electronic devices, to a greater extent than for stationary electronic devices such as desktop Personal Computers (PCs) or the like.

For example, in Patent Document 1 or Patent Document 2 a motor is proposed in which a shaft is fixed to a base plate and a fluid dynamic bearing mechanism is adopted for a bearing.

When manufacturing a motor adopting the fluid dynamic bearing, lubricant is injected into a space between a rotary body and a fixed body. Then, it is necessary to measure the position of a gas-liquid interface of the lubricant injected into the space between the rotary body and the fixed body and determine whether the position is within a predetermined range. Many of shaft fixed type motors have a plurality of gas-liquid interfaces, respectively, and it takes a long time to measure the positions of the plurality of gas-liquid interfaces, respectively. This reduces production efficiency.

PATENT DOCUMENT

[Patent Document 1] Japanese Laid-open Patent Publication No. 2009-162246

[Patent Document 2] Japanese Laid-open Patent Publication No. 2010-127448

SUMMARY OF THE INVENTION

The present invention is made in light of the above problems, and provides a shaft fixed type rotary device capable of improving production efficiency.

According to an embodiment, there is provided a rotary device including a fixed body that includes a shaft; a rotary body that includes a sleeve being configured to surround an periphery of the shaft through lubricant; and a first taper seal and a second taper seal provided in a space between the fixed body and the rotary body in which gas-liquid interfaces of the lubricant exist, respectively, when the rotary device is operated, the first taper seal and the second taper seal being configured such that a lower limit of a filling ratio, which is a ratio of the volume of the lubricant filled in a taper seal with respect to the volume of the respective taper seal, of the second taper seal corresponds to a predetermined range of the filling ratio of the first taper seal including a lower limit of the filling ratio of the first taper seal, and an upper limit of the filling ratio of the second taper seal corresponds to a predetermined filling ratio of the first taper seal that is larger than an upper limit of the predetermined range and lower than an upper limit of the first taper seal.

According to another embodiment, there is provided a rotary device including a fixed body that includes a shaft; a rotary body that includes a sleeve being configured to surround an periphery of the shaft through lubricant; a first taper seal provided in a space between the fixed body and the rotary body in which a first gas-liquid interface of the lubricant exist when the rotary device is operated, and including a first taper portion in which the space becomes larger by a predetermined first proportion in a first direction of a path of the lubricant away from the second taper seal, and a second taper portion that is positioned further from the second taper seal in the first direction in which the space becomes larger by a predetermined second proportion, which is larger than the first proportion; and a second taper seal provided in a space between the fixed body and the rotary body in which a second gas-liquid interface of the lubricant exist when the rotary device is operated, the first taper seal and the second taper seal being configured such that the first gas-liquid interface exists in the first taper portion of the first taper seal as long as the second gas-liquid interface exists at a lower end of the second taper seal and the first gas-liquid interface of the lubricant exists in the second taper portion of the first taper seal even when the second gas-liquid interface exists at an upper end of the second taper seal.

As such, the filling ratio of the first taper seal and the filling ratio of the second taper seal can be made to correspond.

Note that also arbitrary combinations of the above-described constituents, and any exchanges of expressions in the present invention, made among methods, devices, systems and so forth, are valid as embodiments of the present invention.

BRIEF DESCRIPTION OF THE DRAWINGS

Other objects, features and advantages of the present invention will become more apparent from the following detailed description when read in conjunction with the accompanying drawings.

FIG. 6A and FIG. 6B are views for explaining a connected portion between a sidewall of a center hole of a hub and an outer circumferential surface of a sleeve;

DETAILED DESCRIPTION OF THE PREFERRED EMBODIMENTS

Figure 1A:
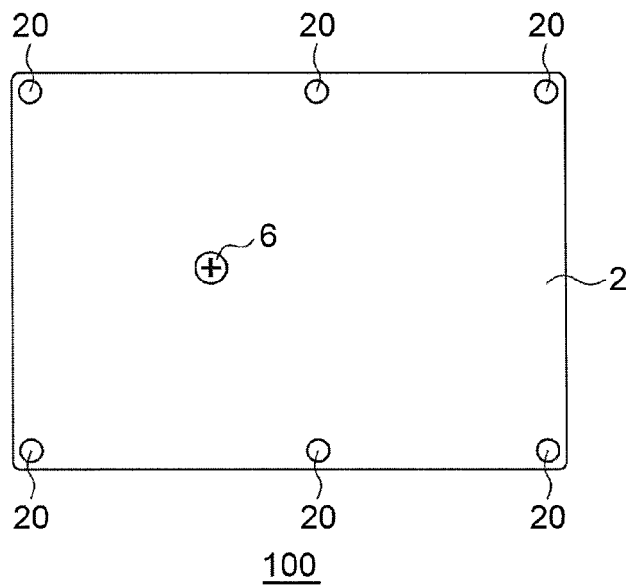
FIG. 1A to FIG. 1C are views illustrating an example of a rotary device of a first embodiment.
Figure 1B:
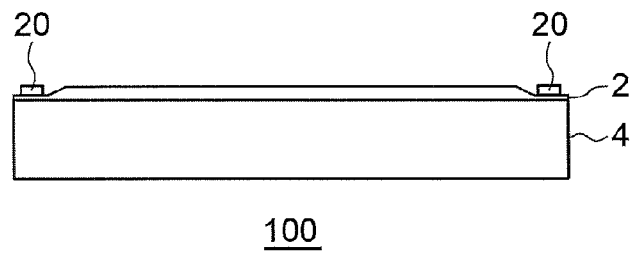
Figure 1C:
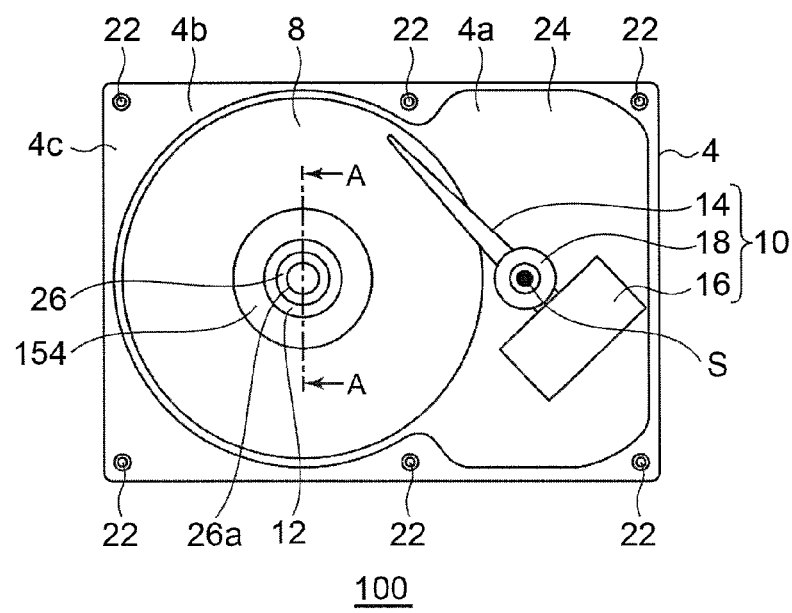

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated. Further, sizes of components are appropriately enlarged or reduced for explanation purposes. Some parts not particularly related to the structure of the embodiment may be omitted.

A rotary device of the following embodiments is appropriately used as a disk drive device such as a hard-disk drive that mounts a magnetic recording disk and rotates and drives the magnetic recording disk. Specifically, the rotary device of the following embodiments is appropriately used for a shaft fixed type disk drive in which a shaft is fixed to a base while a hub is rotated with respect to the shaft.

First Embodiment

The rotary device of a first embodiment is a shaft fixed type rotary device. A shaft is provided at a fixed body side and a sleeve at a rotary body side surrounds the periphery of the shaft through lubricant. The rotary device adopts fluid dynamic bearing. Specifically, both ends of the shaft are supported and there exist two gas-liquid interfaces of the lubricant between the fixed body and the rotary body. The gas-liquid interfaces exit at corresponding taper seals, respectively.

In this embodiment, the taper seals are configured such that when a gas-liquid interface exists at a second taper seal when injecting the lubricant, a gas-liquid interface also exists at a first taper seal such that the lubricant does not spill out from the first taper seal. With this configuration, by measuring the height of the gas-liquid interface at the second taper seal when injecting the lubricant, the height of the gas-liquid interface at the first taper seal can be recognized without measuring the height. As a result, the process of adjusting the injection amount of the lubricant can be simplified and the production efficiency can be improved.

Figure 8:
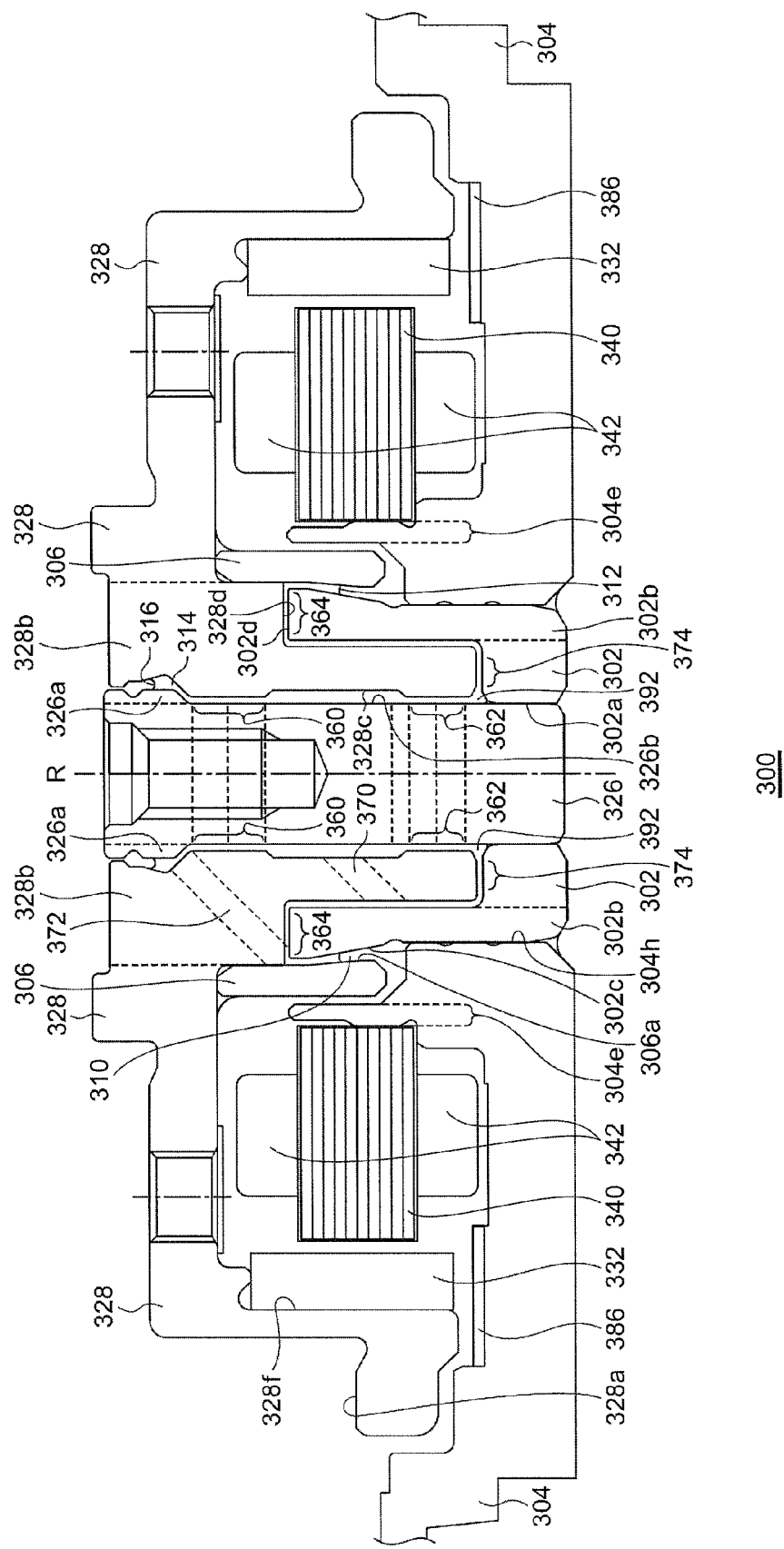
FIG. 8 is a cross-sectional view illustrating an example of the rotary device of a third embodiment.
Figure 9:
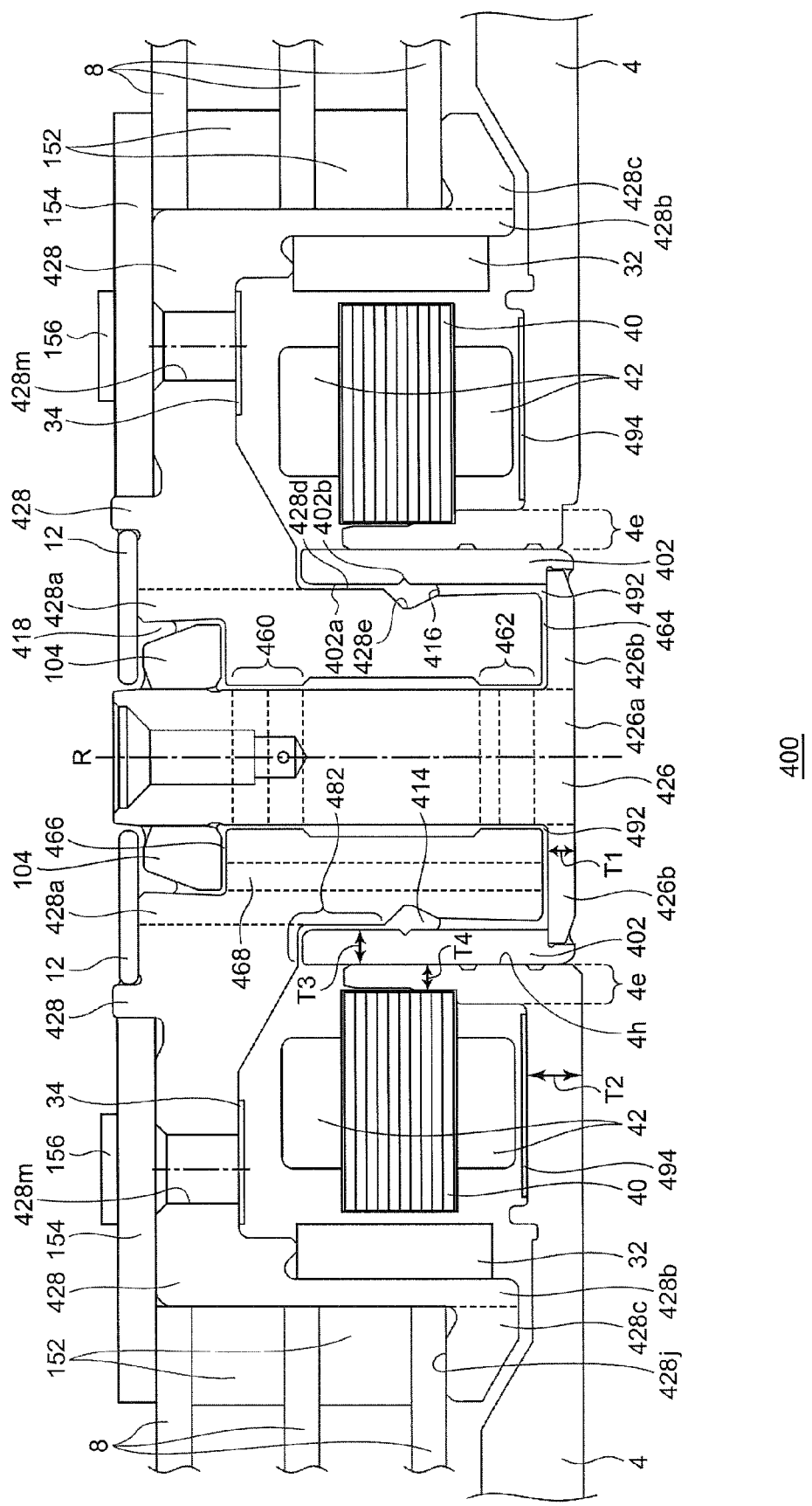
FIG. 9 is a cross-sectional view illustrating an example of the rotary device of a fourth embodiment.
Figure 10:
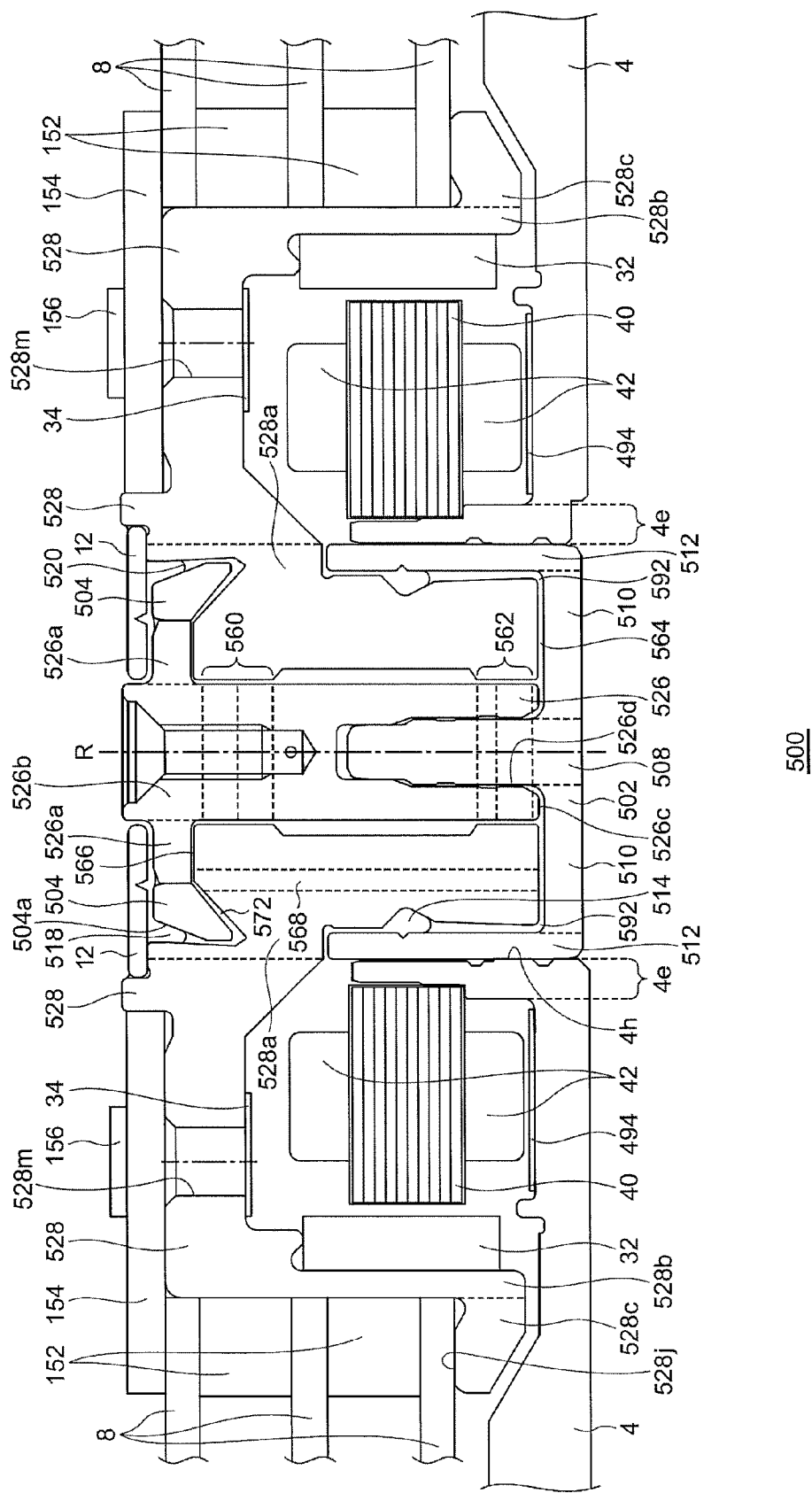
FIG. 10 is a cross-sectional view illustrating an example of the rotary device of a fifth embodiment.

FIG. 1A to FIG. 10 are views illustrating an example of a rotary device 100 of the first embodiment. FIG. 1A is a top view of the rotary device 100. FIG. 1B is a side view of the rotary device 100. FIG. 10 is a top view of the rotary device 100 in which a top cover 2 is removed.

The rotary device 100 includes a fixed body, a rotary body that rotates with respect to the fixed body and a data read/write unit 10. The fixed body includes a base 4, a shaft 26 fixed to the base 4, the top cover 2, six screws 20 and a shaft fixing screw 6. The rotary body includes a cap 12 and a clamper 154. The cap 12 and the clamper 154 are attached to a hub, not shown in FIGS. 1A to 1C. Magnetic recording disks 8 are attached to the rotary body.

In the following, a side where the hub is mounted with respect to the base 4 is referred to as an upper side.

Each of the magnetic recording disks 8 may be a 2.5 inch magnetic recording disk having a diameter of 65 mm, made of glass, provided with a hole having a diameter of 20 mm and having a thickness of 0.65 mm, for example. The rotary body is capable of mounting three of the magnetic recording disks 8.

The base 4 is formed by shaping aluminum alloy by a die-cast. The base 4 includes a bottom plate portion 4a that composes a bottom portion of the rotary device 100 and an outside periphery wall portion 4b that is formed along an outer periphery of the bottom plate portion 4a to surround an area where the magnetic recording disks 8 are mounted. An upper surface 4c of the outside periphery wall portion 4b is provided with six screw holes 22.

The data read/write unit 10 includes a recording and playing head (not shown in the drawings), a swing arm 14, a voice coil motor 16 and a pivot assembly 18. The recording and playing head is attached to a front end portion of the swing arm 14, records data on the magnetic recording disk 8 and reads data from the magnetic recording disk 8. The pivot assembly 18 oscillatably supports the swing arm 14 with respect to the base 4 around a head rotational axis S. The voice coil motor 16 oscillates the swing arm 14 around the head rotational axis S and moves the recording and playing head to a desired position above the magnetic recording disk 8. The voice coil motor 16 and the pivot assembly 18 are configured by known techniques for controlling positioning of the head.

The top cover 2 is fixed to the upper surface 4c of the outside periphery wall portion 4b of the base 4 by the six screws 20. The six screws 20 correspond to the six screw holes 22, respectively. Specifically, the top cover 2 and the upper surface 4c of the outside periphery wall portion 4b are fixed with each other such that leaking does not occur from the connected portion to inside the rotary device 100. Specifically, the inside of the rotary device 100 is a clean space 24 surrounded by the bottom plate portion 4a of the base 4, the outside periphery wall portion 4b of the base 4 and the top cover 2. The rotary device 100 is designed such that the clean space 24 is sealed, in other words, leak-in from the outside or leak-out to the outside does not occur. The clean space 24 is filled with clean air from which particles are removed. With this, adhesion of contaminants such as particles or the like to the magnetic recording disks 8 can be suppressed, and the reliability of the operation of the rotary device 100 is increased.

The shaft 26 is provided with shaft fixing screw holes 26a at an upper end surface. The lower end of the shaft 26 is fixed to the base 4 as will be explained later. The upper end of the shaft 26 is fixed to the top cover 2 by having the shaft fixing screw 6 penetrate the top cover 2 to be screwed with the shaft fixing screw holes 26a.

With shaft fixed type rotary devices, resistance against shock or resistance against vibration of the rotary device 100 can be increased, according to the use of the aforementioned type of the rotary device in which both ends of the shaft 26 are fixed to a chassis such as the base 4, the top cover 2 or the like. In such a type of rotary device, when the fluid dynamic bearing is adopted, generally, there exist two gas-liquid interfaces of the lubricant.

Figure 2:
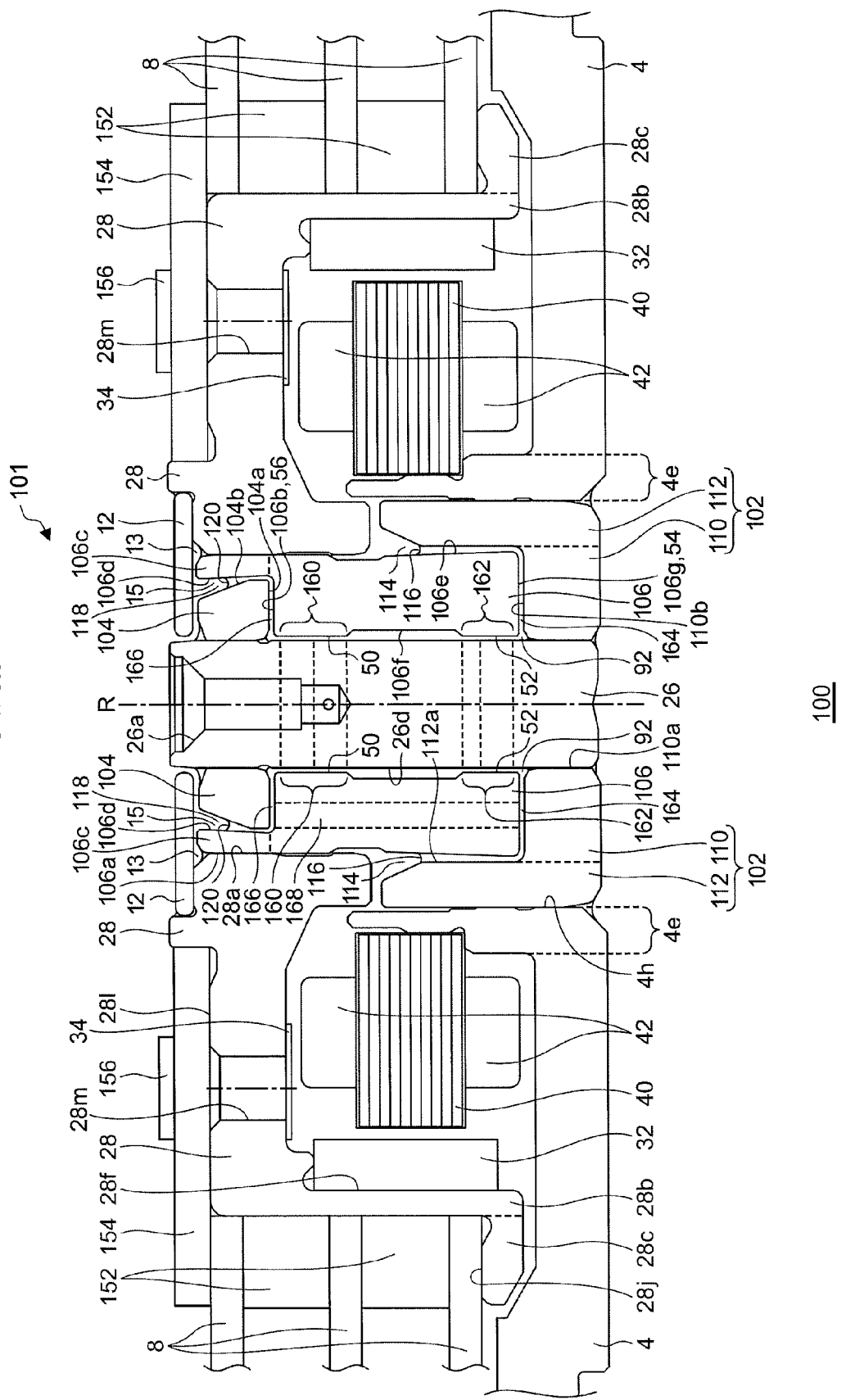
FIG. 2 is a cross-sectional view taken along an A-A line in FIG. 1C.

FIG. 2 is a cross-sectional view taken along an A-A line in FIG. 10.

In addition to the cap 12 and the clamper 154, the rotary body includes a hub 28, a cylindrical magnet 32 and a sleeve 106. In addition to the base 4 and the shaft 26, the fixed body includes a stacked core 40, coils 42, a housing 102 and an overhang surrounding portion 104. There exists lubricant 92 at a part of a space between the rotary body (the sleeve 106 or the like) and the fixed body (the housing 102, the shaft 26, the overhang surrounding portion 104 or the like) in a continuous manner.

When manufacturing the rotary device 100, a fluid dynamic bearing unit 101 including the housing 102, the shaft 26 and the overhang surrounding portion 104 at the fixed body side, the sleeve 106 at the rotary body side and the lubricant 92 is manufactured. Then the rotary device 100 in which the hub 28, the base 4 or the like are attached to the fluid dynamic bearing unit 101 is manufactured. The base 4 rotatably supports the hub 28 through the fluid dynamic bearing unit 101.

The hub 28 is fixed to an outer periphery side of the sleeve 106. The hub 28 is made of a material having soft magnetic properties such as, for example, a steel material such as SUS430F or the like, or aluminum. For example, the hub 28 is formed to have a predetermined shape, substantially a cup shape, provided with a center hole 28a along a rotational axis R by performing press working or cutting on a steel plate, for example. For the steel material for the hub 28, for example, stainless steel whose product name is DHS1, manufactured by Daido Steel Co., Ltd., may be used as outgassing is small and being easy to be processed. Alternatively, stainless steel whose product name is DHS2, manufactured by Daido Steel Co., Ltd., may be used as having a good corrosion resistance. The hub 28 may be processed with a surface treatment such as plating, resin coating or the like. The hub 28 of the embodiment includes a surface layer made of electroless nickel plating. With this structure, peeling of small residue adhered to the processed surface can be suppressed.

The sleeve 106 engages the hub 28 in the center hole 28a. In other words, an outer circumferential surface 106a of the sleeve 106 at its upper portion is connected to a sidewall of the center hole 28a of the hub 28. The connected portion is explained later.

The hub 28 includes a hub protruding portion 28b that engages center holes of the magnetic recording disks 8, respectively, and a mounting portion 28c that is provided outside of the hub protruding portion 28b in a radial direction (a direction perpendicular to the rotational axis R). The magnetic recording disk 8 is mounted on a disk mounting surface 28j of the mounting portion 28c.

An annular spacer 152 is inserted between the two magnetic recording disks 8, which are adjacent from each other in the axial direction, which is a direction parallel to the rotational axis R of the rotary body. The clamper 154 pushes the three magnetic recording disks 8 and the two spacers 152 toward the disk mounting surface 28j to be fixed. The magnetic recording disks 8 are fixed to the hub 28 by being interposed by the clamper 154 and the mounting portion 28c. The clamper 154 is fixed to an upper surface 28l of the hub 28 by a plurality of clamp screws 156. Specifically, the clamp screws 156 are screwed with clamp screw holes 28m provided at the hub protruding portion 28b, respectively.

The clamp screw holes 28m are provided to penetrate the hub protruding portion 28b, respectively. A lower end of each of the clamp screw holes 28m is blocked by a block member 34 such as a tape or the like. With this, the clamp screw holes 28m can be easily formed as being through holes and the diffusion of the steam of the lubricant 92 from the inside to the outside of the hub 28 can be suppressed.

The cylindrical magnet 32 is fixed to a cylindrical inner circumferential surface 28f of the hub protruding portion 28b by bonding. The cylindrical magnet 32 may be, for example, made of a rare earth magnetic material or a ferrite magnetic material. In this embodiment, the cylindrical magnet 32 is made of a neodymium system rare earth magnetic material. The cylindrical magnet 32 is polarized to have 16 poles for driving in a circumferential direction (tangent directions of a circle whose center is the rotational axis R and is perpendicular to the rotational axis R). The cylindrical magnet 32 is applied with a surface layer forming process, such as by electro deposition, spray coating or the like at its surface, for example, to suppress generation of rust.

The stacked core 40 includes an annular portion and 12 salient poles that extend outwardly from the annular portion in a radial direction and is fixed to an upper surface side of the base 4. The stacked core 40 is formed by stacking 10 thin electromagnet steel plates and formed to be in an integral body by caulking. The stacked core 40 is applied with an insulating coating such as by electro deposition, powder coating or the like at its surface. Each of the coils 42 is wound around the respective salient poles of the stacked core 40.

When a drive current having a substantially sine wave shape of three phases flows through the coil 42, drive magnetic flux is generated along the salient poles.

The cylindrical magnet 32 faces the 12 salient poles of the stacked core 40 in a radial direction.

The base 4 includes a cylindrical protruding portion 4e whose center is the rotational axis R. The protruding portion 4e is provided to protrude upward from the upper surface of the base 4 to surround the periphery of the housing 102. The stacked core 40 is fixed to the base 4 when an outer circumferential surface of the protruding portion 4e engages with the stacked core 40 in a center hole of the annular portion of the stacked core 40. Specifically, the stacked core 40 and the protruding portion 4e of the base 4 are fixed by press fitting or a running fit with bonding.

The housing 102 is made of a steel material such as SUS or the like. The housing 102 includes a flat circular shaft supporting portion 110 and a cylindrical sleeve surrounding portion 112 that is fixed to the shaft supporting portion 110 at an outer periphery side. The shaft supporting portion 110 and the sleeve surrounding portion 112 are formed such that the entirety of the outer circumferential surface of the shaft supporting portion 110 is connected to a lower portion of an inner circumferential surface 112a of the sleeve surrounding portion 112. Specifically, the shaft supporting portion 110 and the sleeve surrounding portion 112 are integrally formed. With this structure, manufacturing error of the housing 102 can be reduced and the process of connecting the components can be omitted. The sleeve surrounding portion 112 is surrounded by the protruding portion 4e of the base 4. Specifically, the sleeve surrounding portion 112 is fixed to an inner circumferential surface, in other words, a bearing hole 4h, whose center is the rotational axis R, provided at the base 4, of the protruding portion 4e, by bonding.

The lower end of the shaft 26 is inserted into and fixed to an inner circumferential surface, in other words, a shaft hole 110a, whose center is the rotational axis R, provided at the shaft supporting portion 110, of the shaft supporting portion 110 by bonding or pressing.

The overhang surrounding portion 104 surrounds the periphery of the shaft 26 at the upper end side to be fixed to the shaft 26 by, for example, bonding or a combination of bonding and pressing.

The sleeve 106 is formed by cutting a base material made of brass, aluminum or DHS1 into a desired shape, and performing nickel plating on the obtained object. The sleeve 106 surrounds the periphery of a part of the shaft 26 at a middle between a part that engages with the shaft hole 110a of the housing 102 and a part surrounded by the overhang surrounding portion 104. The lubricant 92 is provided between the sleeve 106 and the shaft 26. In other words, the inner circumferential surface 106f of the sleeve 106 and the outer circumferential surface 26d of the shaft 26 at the middle part face each other with a first space, which is filled with the lubricant 92, therebetween.

The rotary device 100 includes a first radial dynamic pressure generator 160 and a second radial dynamic pressure generator 162 each generates dynamic pressure in the radial direction in the lubricant 92 when the rotary body is rotated, in the first space. The first radial dynamic pressure generator 160 and the second radial dynamic pressure generator 162 are separated from each other in the axial direction where the first radial dynamic pressure generator 160 is positioned above the second radial dynamic pressure generator 162. The inner circumferential surface 106f of the sleeve 106 is provided with a first radial dynamic pressure generation groove 50 and a second radial dynamic pressure generation groove 52, each having a herringbone shape or a spiral shape, at positions corresponding to the first radial dynamic pressure generator 160 and the second radial dynamic pressure generator 162, respectively. Here, at least one of the first radial dynamic pressure generation groove 50 and the second radial dynamic pressure generation groove 52 may be provided at the outer circumferential surface 26d at the middle part of the shaft 26 instead of at the inner circumferential surface 106f of the sleeve 106. The first and second dynamic pressure generation grooves 50 and 52 may be made by piezo processing.

The sleeve 106 is interposed between the overhang surrounding portion 104 and the shaft supporting portion 110 in the axial direction. The lubricant 92 exists between the sleeve 106 and the overhang surrounding portion 104 and between the sleeve 106 and the shaft supporting portion 110, respectively. This means that the upper surface 106b of the sleeve 106 and the lower surface 104a of the overhang surrounding portion 104 face each other through a second space, which is filled with the lubricant 92. A lower surface 106g of the sleeve 106 and the upper surface 110b of the shaft supporting portion 110 face each other through a third space, which is filled with the lubricant 92.

The rotary device 100 includes a first thrust dynamic pressure generator 164 that generates dynamic pressure in the axial direction in the lubricant 92 when the rotary body is rotated, in the third space. The lower surface 106g of the sleeve 106 is provided with a first thrust dynamic pressure generation groove 54, having a herringbone shape or a spiral shape, at a position corresponding to the first thrust dynamic pressure generator 164. Alternatively, the first thrust dynamic pressure generation groove 54 may be provided at the upper surface 110b of the shaft supporting portion 110 instead of at the lower surface 106g of the sleeve 106.

The rotary device 100 includes a second thrust dynamic pressure generator 166 that generates dynamic pressure in the axial direction in the lubricant 92 when the rotary body is rotated, in the second space. The upper surface 106b of the sleeve 106 is provided with a thrust dynamic pressure generation groove 56, having a herringbone shape or a spiral shape, at a position corresponding to the second thrust dynamic pressure generator 166. Alternatively, the second thrust dynamic pressure generation groove 56 may be provided at the lower surface 104a of the overhang surrounding portion 104 instead of at the upper surface 106b of the sleeve 106.

When the rotary body is relatively rotated with respective to the fixed body, the first radial dynamic pressure generation groove 50, the second radial dynamic pressure generation groove 52, the first thrust dynamic pressure generation groove 54 and the second thrust dynamic pressure generation groove 56 generate the dynamic pressure in the lubricant 92, respectively. The rotary body is supported in the radial direction and in the axial direction without contacting the fixed body by the dynamic pressure.

For the positional relationship between the sleeve surrounding portion 112 and the sleeve 106, the sleeve surrounding portion 112 surrounds the periphery of the sleeve 106 at its lower portion. A first taper seal 114 is formed between the sleeve surrounding portion 112 and the sleeve 106. The first taper seal 114 is configured such that a fourth space between the inner circumferential surface 112a of the sleeve surrounding portion 112 and an outer circumferential surface 106e of the sleeve 106 at its lower portion gradually expands upwardly.

As described above, the lubricant 92 exists between the sleeve 106 and the overhang surrounding portion 104, between the sleeve 106 and the shaft 26 and between the sleeve 106 and the housing 102. Then, a first gas-liquid interface 116 of the lubricant 92 exists in the first taper seal 114 when the rotary device 100 is operated. Here, the spaces between the sleeve 106 and the overhang surrounding portion 104, the shaft 26 and the housing 102 where the lubricant 92 is to be filled is referred to as a "path of the lubricant 92" in the following description.

The sleeve 106 includes an upper taper generation portion 106c that faces the overhang surrounding portion 104 in the radial direction. The upper taper generation portion 106c surrounds the periphery of the overhang surrounding portion 104. A second taper seal 118 is provided between the upper taper generation portion 106c and the overhang surrounding portion 104 in which a fifth space between the inner circumferential surface 106d of the upper taper generation portion 106c and the outer circumferential surface 104b of the overhang surrounding portion 104 gradually expands upwardly. A second gas-liquid interface 120 of the lubricant 92 exits in the second taper seal 118 while using the rotary device 100.

The sleeve 106 is provided with a bypass connection hole 168 that bypasses the first radial dynamic pressure generator 160 and the second radial dynamic pressure generator 162. Specifically, the bypass connection hole 168 connects upstream of the first radial dynamic pressure generator 160 and downstream of the second radial dynamic pressure generator 162 when seen from the second taper seal 118 side. The upper end of the bypass connection hole 168 exists in the second space while the lower end of the bypass connection hole 168 exists in the third space. The bypass connection hole 168 penetrates the sleeve 106 in the axial direction. The bypass connection hole 168 is formed such that a ratio of the diameter of the bypass connection hole 168 with respect to the diameter of the inner circumferential surface 106f of the sleeve 106 becomes more than 0.13. As an example, the diameter of the bypass connection hole 168 is within a range between 0.35 mm to 0.50 mm, and the diameter of the inner circumferential surface 106f of the sleeve 106 is about 2.5 mm.

When the bypass connection hole is relatively small, if the pressure of the lubricant 92 is varied drastically by an upward or downward movement of the rotary device 100, by the shock to the rotary device 100 or the like, the lubricant 92 may show an expected behavior. Thus, in this embodiment, the bypass connection hole 168 is made relatively large to increase a function of averaging the pressure of the lubricant 92 to stabilize the behavior of the lubricant 92.

The cap 12 has an annular shape and is fixed to the upper surface 28l of the hub 28 by bonding for covering the second taper seal 118 and the overhang surrounding portion 104. The cap 12 is made of a metal material such as SUS430, SUS304, brass or the like, or a resin material. The hub 28, the sleeve 106 and the cap 12 form a steam trap space 13. The steam trap space 13 is in communication with a space 15 surrounded by the outer circumferential surface 104b of the overhang surrounding portion 104 and the inner circumferential surface 106d of the upper taper generation portion 106c. The steam trap space 13 is positioned outside of the space 15 in the radial direction. When the sleeve 106 is rotated, at least a part of the steam of the lubricant 92 evaporated from the second gas-liquid interface 120 is captured in the steam trap space 13 by the centrifugal force. With this configuration, the amount of the steam of the lubricant 92 discharged to the clean space 24 can be suppressed.

When the space between the cap 12 and the fixed body is large, the amount of the steam of the lubricant 92 evaporated from the second gas-liquid interface 120 and discharged to the clean space 24 increases. On the other hand, when the space between the cap 12 and the fixed body is small, there is a possibility that the cap 12 contacts the fixed body. By the study by the present inventors, it is confirmed that the discharged amount of the steam of the lubricant 92 is suppressed to a level not causing a trouble in use, as well as the possibility that the cap 12 contacts the fixed body can be reduced to a level not causing a trouble in use by setting the minimum space between the cap 12 and the fixed body in the axial direction within a range between 0.06 mm to 0.18 mm. Further, it is confirmed that the discharged amount of the steam of the lubricant 92 is suppressed to a level not causing a trouble in use, as well as the possibility that the cap 12 contacts the fixed body can be reduced to a level not causing a trouble in use by setting the minimum space between the cap 12 and the fixed body in the radial direction within a range between 0.01 mm to 0.15 mm.

Figure 3A:
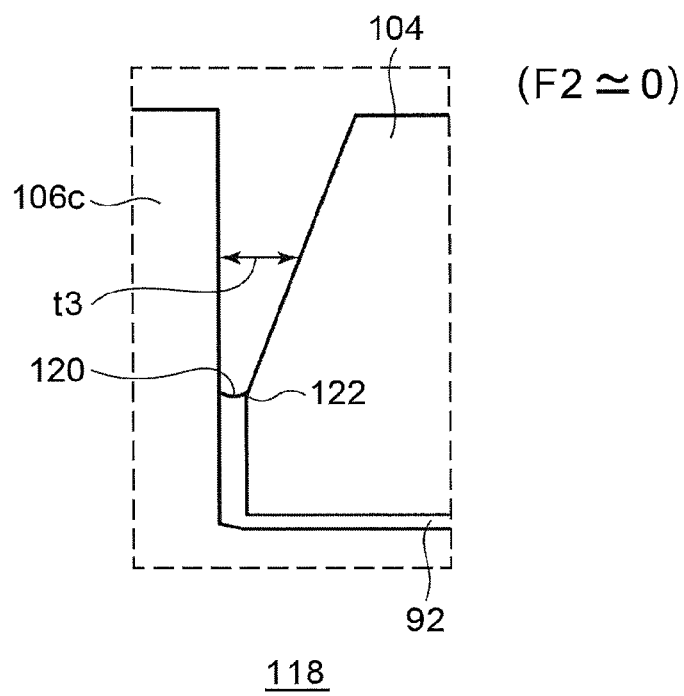
FIG. 3A and FIG. 3B are enlarged cross-sectional views illustrating taper seals, respectively.
Figure 3B:
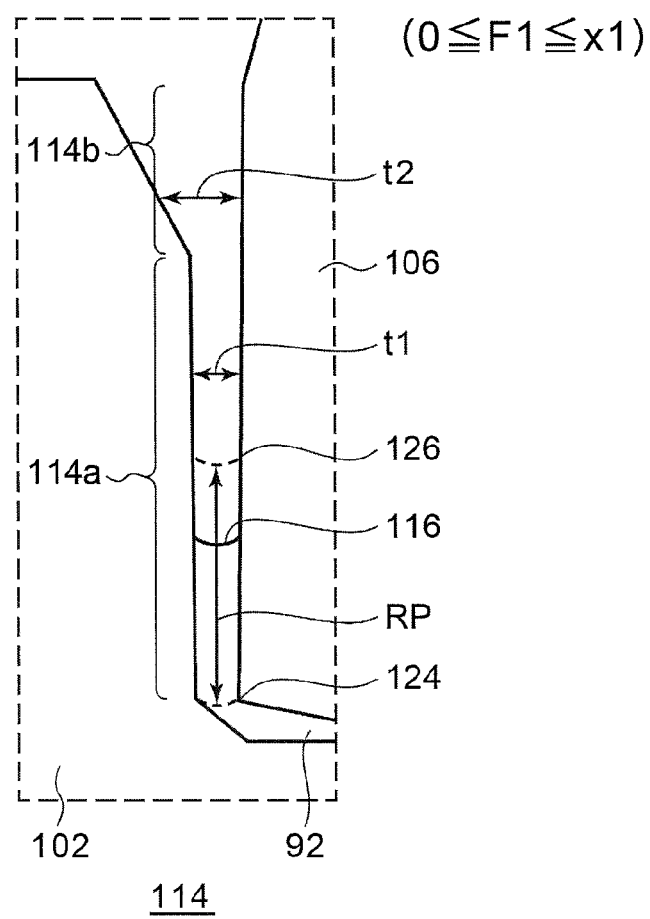

FIG. 3A and FIG. 3B are enlarged cross-sectional views of the taper seals, respectively. FIG. 3A is an enlarged cross-sectional view of the second taper seal 118. FIG. 3B is an enlarged cross-sectional view of the first taper seal 114. In the following, a ratio of the volume of the lubricant 92 filled in the taper seal with respect to the volume of the taper seal is referred to as "filling ratio".

First filling ratio F1 of the first taper seal 114 is a value obtained by dividing the volume OV1 of the lubricant 92 filled in the first taper seal 114 by the volume TV1 of the first taper seal 114 (F1=OV1/TV1). Second filling ratio F2 of the second taper seal 118 is a value obtained by dividing the volume OV2 of the lubricant 92 filled in the second taper seal 118 by the volume TV2 of the second taper seal 118 (F2=OV2/TV2).

When moving along the path of the lubricant 92, in the first taper seal 114, the higher the position becomes, the further the distance from the second taper seal 118 becomes. With reference to FIG. 3B, the first taper seal 114 includes a first taper portion 114a and a second taper portion 114b provided at an upper side of the first taper portion 114a. In the first taper portion 114a, a space t1 between the housing 102 and the sleeve 106 becomes larger upwardly by a predetermined first proportion while in the second taper portion 114b, a space t2 between the housing 102 and the sleeve 106 becomes larger upwardly by a second proportion, which is larger than the first proportion.

When defining a z coordinate as the axial direction, the space t1 of the first taper portion 114a becomes a function of z. The first proportion may be defined as a differential coefficient (dt1/dz) of t1 with respect to z. The second proportion may be similarly defined as a differential coefficient (dt2/dz) of t2 with respect to z.

The first taper portion 114a and the second taper portion 114b are directly connected. When it is assumed that the volume of the first taper portion 114a is "TV3" and the volume of the second taper portion 114b is "TV4", the volume TV1 of the first taper seal 114 becomes, TV1=TV3+TV4.

In the second taper seal 118, a space t3 between the upper taper generation portion 106c and the overhang surrounding portion 104 becomes larger upwardly by a third proportion, which is larger than the first proportion and smaller than the second proportion.

Figure 11A:
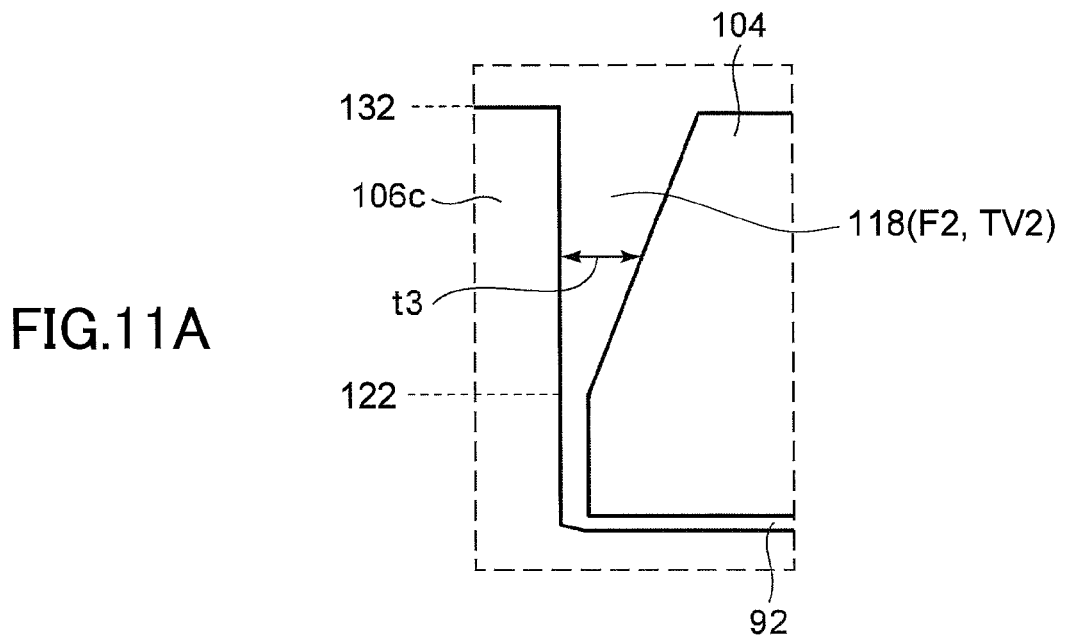
FIG. 11A and FIG. 11B are enlarged cross-sectional views illustrating taper seals, respectively.
Figure 11B:
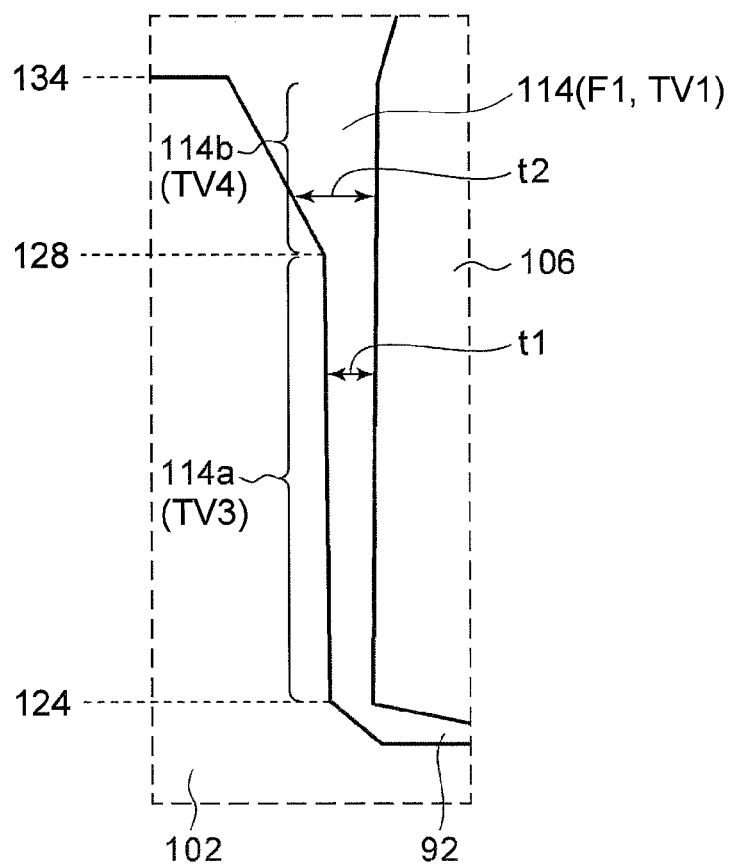

FIG. 11A and FIG. 11B correspond to FIG. 3A and FIG. 3B, respectively. With reference to FIG. 11A, the second taper seal 118 is defined by a lower end 122 and an upper end 132. Similarly, with reference to FIG. 11B, the first taper portion 114a of the first taper seal 114 is defined by a lower end 124 and an upper end 128. The second taper portion 114b of the first taper seal 114 is defined by a lower end 128, which is the same as the upper end of the first taper portion 114a, and an upper end 134.

Referring back to FIG. 3A and FIG. 3B, when the amount of the lubricant 92 is to fill the path of the lubricant 92 other than the first taper seal 114 and the second taper seal 118, the second gas-liquid interface 120 exists at the lower end 122 of the second taper seal 118 (FIG. 3A), and the first gas-liquid interface 116 exists at the lower end 124 of the first taper portion 114a (FIG. 3B).

When the amount of the lubricant 92 is increased by injecting the lubricant 92 from the second taper seal 118, for example, the first gas-liquid interface 116 and/or the second gas-liquid interface 120 is to move upward. According to the rotary device 100 of the embodiment, as the third proportion of the second taper seal 118 is larger than the first proportion of the first taper portion 114a, the increased amount of the lubricant 92 is predominantly received in the first taper portion 114a. Thus, the first gas-liquid interface 116 moves upward in the first taper portion 114a while the second gas-liquid interface 120 stays at the lower end 122 of the second taper seal 118. When the amount of the lubricant 92 is further increased and the first gas-liquid interface 116 in the first taper portion 114a moves up to a position 126, the second gas-liquid interface 120 starts moving upward from the lower end 122 of the second taper seal 118. Specifically, the first gas-liquid interface 116 exists within a predetermined positional range RP in the first taper portion 114a, which is shown by an arrow in FIG. 3B, under a state that the second gas-liquid interface 120 substantially exists at the lower end 122 of the second taper seal 118. The lower limit of the positional range RP is the lower end 124 of the first taper portion 114a and the upper limit of the positional range RP is the position 126.

The second filling ratio F2 when the second gas-liquid interface 120 exists at the lower end 122 of the second taper seal 118 is the lower limit, in other words, substantially zero. The first filling ratio F1 when the first gas-liquid interface 116 exists at the lower end 124 of the first taper portion 114a is the lower limit, in other words, substantially zero.

Here, the first filling ratio F1 when the first gas-liquid interface 116 exists at the position 126 in the first taper portion 114a is referred to as "x1", where x1 is smaller than TV3/TV1.

Therefore, the lower limit of the second filling ratio F2 corresponds to a range 0 (the lower limit)≤F1≤x1 of the first filling ratio F1. Thus, the first taper seal 114 and the second taper seal 118 are configured such that it is ensured that the first filling ratio F1 does not exceed x1 as long as the second filling ratio F2 is at the lower limit.

In other words, the first taper seal 114 and the second taper seal 118 are configured such that the first gas-liquid interface 116 is to exist within the first taper portion 114a of the first taper seal 114 as long as the second gas-liquid interface 120 exists at the lower end 122 of the second taper seal 118.

Figure 4A:
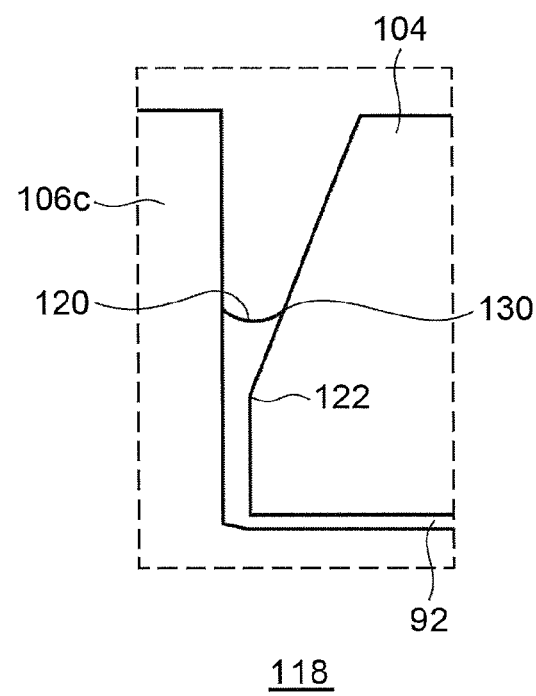
FIG. 4A and FIG. 4B are enlarged cross-sectional views illustrating taper seals, respectively.
Figure 4B:
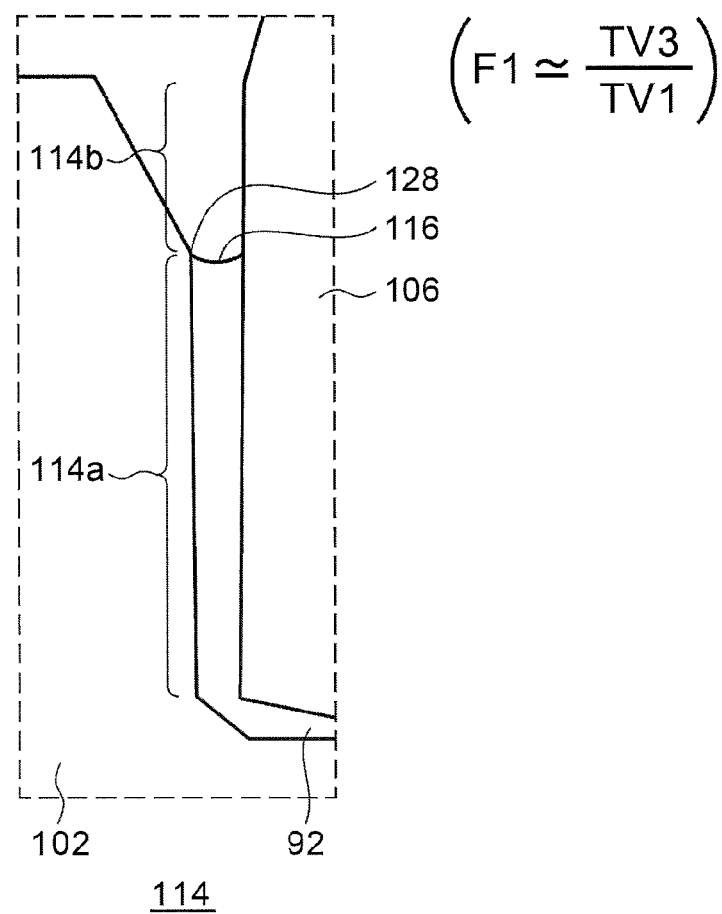

FIG. 4A and FIG. 4B are enlarged cross-sectional views of the taper seals, respectively. FIG. 4A is an enlarged cross-sectional view of the second taper seal 118. FIG. 4B is an enlarged cross-sectional view of the first taper seal 114. When the amount of the lubricant 92 is further increased from the state shown in FIG. 3A and FIG. 3B, the first gas-liquid interface 116 reaches the upper end 128 of the first taper portion 114a. At this time, the first filling ratio F1 is substantially equal to TV3/TV1. The upper end 128 of the first taper portion 114a is also the lower end of the second taper portion 114b.

At the time when the first gas-liquid interface 116 reaches the upper end 128 of the first taper portion 114a, the second gas-liquid interface 120 is already moved upward, away from the lower end 122 of the second taper seal 118, and is at a position 130 in the second taper seal 118.

Figure 5A:
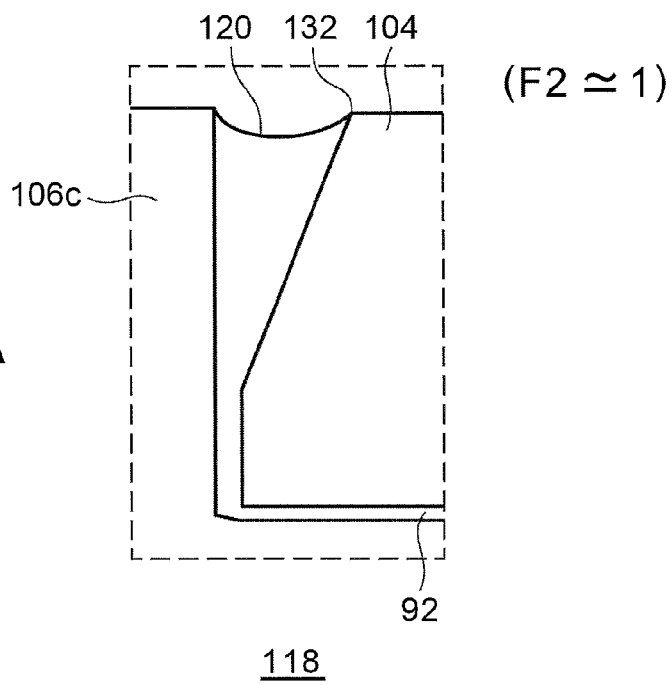
FIG. 5A and FIG. 5B are enlarged cross-sectional views illustrating taper seals, respectively.
Figure 5B:
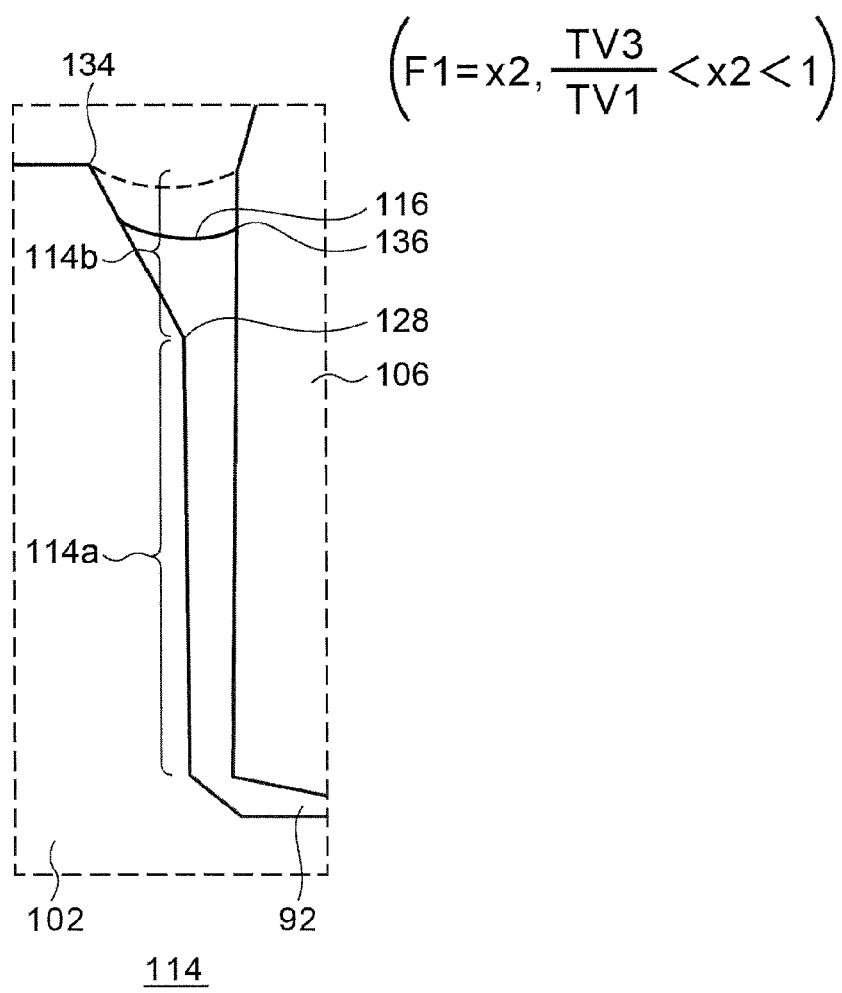

FIG. 5A and FIG. 5B are enlarged cross-sectional views of the taper seals, respectively. FIG. 5A is an enlarged cross-sectional view of the second taper seal 118. FIG. 5B is an enlarged cross-sectional view of the first taper seal 114. When the amount of the lubricant 92 is further increased from the state shown in FIG. 4A and FIG. 4B, as the second proportion of the second taper portion 114b is larger than the third proportion of the second taper seal 118, the increased amount of the lubricant 92 is predominantly received in the second taper seal 118. Thus, the second gas-liquid interface 120 moves upward in the second taper seal 118 while the first gas-liquid interface 116 exists substantially at the upper end 128 of the first taper portion 114a. When the amount of the lubricant 92 is further increased, the first gas-liquid interface 116 starts moving upward from the upper end 128 of the first taper portion 114a while the second gas-liquid interface 120 moves upward in the second taper seal 118.

When the amount of the lubricant 92 is further increased, the second gas-liquid interface 120 reaches the upper end 132 of the second taper seal 118. At this time, the second filling ratio F2 is the upper limit, in other words, 1. According to the embodiment, the first taper seal 114 and the second taper seal 118 are configured such that even when the second gas-liquid interface 120 reaches the upper end 132 of the second taper seal 118, the first gas-liquid interface 116 does not reach the upper end 134 of the second taper portion 114b and exists in the second taper portion 114b.

When the second gas-liquid interface 120 exists at the upper end 132 of the second taper seal 118, the first gas-liquid interface 116 exists at a position 136 in the second taper portion 114b. The first filling ratio F1 when the first gas-liquid interface 116 exists at the position 136 in the second taper portion 114b is referred to as "x2", where TV3/TV1<x2<1 (the upper limit).

Therefore, the upper limit of the second filling ratio F2 corresponds to x2. Thus, the first taper seal 114 and the second taper seal 118 are configured such that the first filling ratio F1 does not become lower than the upper limit even when the second filling ratio F2 reaches the upper limit.

In other words, the first taper seal 114 and the second taper seal 118 are configured such that the first gas-liquid interface 116 is to exist within the second taper portion 114b of the first taper seal 114, not to reach the upper end 134, even when the second gas-liquid interface 120 exists at the upper end 132 of the second taper seal 118.

FIG. 6A and FIG. 6B are views for explaining a connected portion between the sidewall of the center hole 28a provided in the hub 28 and the outer circumferential surface 106a of the sleeve 106 at its upper portion. FIG. 6A shows a status in which the sleeve 106 (the fluid dynamic bearing unit 101) is in the middle of being inserted into the center hole 28a from the lower side and FIG. 6B shows a status in which the sleeve 106 is completely inserted into the center hole 28a.

The sidewall of the center hole 28a is provided with a circular first concave portion 138. The outer circumferential surface 106a of the sleeve 106 at its upper portion is provided with a circular second concave portion 140. The side wall of the center hole 28a has a first portion 28u that faces the second concave portion 140 and a second portion 28t that is positioned at the upper side of the first portion 28u while interposing the first concave portion 138 therebetween. Specifically, the first portion 28u is positioned at the lower side of the first concave portion 138 while the second portion 28t is positioned at the upper side of the first concave portion 138 of the sidewall of the center hole 28a. The sidewall of the center hole 28a is formed such that the diameter of the first portion 28u becomes substantially the same as that of the second portion 28t.

With reference to FIG. 6B, the first concave portion 138 corresponds to the first radial dynamic pressure generator 160 in the axial direction. Specifically, the first concave portion 138 is formed to surround at least a part of the first radial dynamic pressure generator 160. In other words, the area where the first concave portion 138 exists and the area where the first radial dynamic pressure generator 160 exists have a common part in the axial direction.

The second concave portion 140 partially overlaps the first concave portion 138 in the axial direction. There is a space (142, 146 and 144) between the hub 28 and the sleeve 106. A part of the space between the hub 28 and the sleeve 106 where the first concave portion 138 is formed is referred to as an upper space 142. A part of the space between the hub 28 and the sleeve 106 where the second concave portion 140 is formed is referred to as a lower space 144. A part of the space between the hub 28 and the sleeve 106 where the second concave portion 140 and the first concave portion 138 overlap and between the upper space 142 and the lower space 144 is referred to as an intermediate space 146. The second portion 28t is pressed to be in contact with the outer circumferential surface 106a of the sleeve 106.

The sidewall of the center hole 28a is formed such that the second portion 28t does not overlap the first radial dynamic pressure generator 160 in the axial direction. Specifically, the first concave portion 138 is formed such that the upper end of the first concave portion 138 is positioned upper than or equal to the upper end of the first radial dynamic pressure generator 160 in the axial direction. As an example, the range where the second portion 28t exists and the range where the first radial dynamic pressure generator 160 exists do not overlap in the axial direction.

With reference to FIG. 6A, when inserting the sleeve 106 into the center hole 28a of the hub 28, both the first portion 28u and the second portion 28t are pressed to be in contact with the outer circumferential surface 106a of the sleeve 106. At this time, the sleeve 106 is supported at two positions of the hub 28, and backlash is hardly generated so that the sleeve 106 can be positioned vertically with respect to the hub 28.

With reference to FIG. 6B, after completely inserting the sleeve 106 to the center hole 28a of the hub 28, there is the space between the first portion 28u and the outer circumferential surface 106a of the sleeve 106. Thus, the sidewall of the center hole 28a and the outer circumferential surface 106a of the sleeve 106 only contact with each other at the second portion 28t. With this, an undesired effect to the first radial dynamic pressure generator 160 by the pressure caused by the contact between the hub 28 and the sleeve 106 can be reduced. Specifically, deformation of the first radial dynamic pressure generator 160 by the influence of the pressure caused by the contact between the hub 28 and the sleeve 106 can be suppressed.

Here, an adhesive material may be partially filled in the intermediate space 142, the lower space 144 or in the overlapped intermediate space 146.

Further, the influence on the first radial dynamic pressure generator 160 can be reduced even when the connected portion of the sidewall of the center hole 28a and the outer circumferential surface 106a of the sleeve 106 overlaps the first radial dynamic pressure generator 160 in the axial direction, the first radial dynamic pressure generator 160 can be positioned further upper side to spread a bearing span.

Alternatively, the first concave portion (the upper concave portion) may be formed at the outer circumferential surface of the sleeve 106 while the second concave portion (the lower concave portion) may be formed at the sidewall of the center hole 28a of the hub 28. At this time, the same advantage as described above can be obtained by inserting the sleeve 106 into the center hole 28a of the hub 28 from the upper side.

The operation of the rotary device 100 of the embodiment is explained next.

First, a drive current of three phases is supplied to the coils 42 for rotating the magnetic recording disks 8. When the drive current flows through the coils 42, magnetic flux is generated along the 12 salient poles. The rotary body and the magnetic recording disks 8 that engage the rotary body are rotated by torque applied to the cylindrical magnet 32 by the magnetic flux. At the same time, the recording and playing head moves within an oscillating range on the magnetic recording disks 8 when the voice coil motor 16 oscillates the swing arm 14. The recording and playing head converts magnetic data recorded in the magnetic recording disks 8 to an electric signal and transmits the electric signal to a control substrate (not shown in the drawings) and converts an electric signal sent from the control substrate to magnetic data and writes the magnetic data on the magnetic recording disks 8.

According to the rotary device 100 of the embodiment, by controlling the height of the second gas-liquid interface 120 of the second taper seal 118, the height of the first gas-liquid interface 116 of the first taper seal 114 can also be controlled. Specifically, when the second gas-liquid interface 120 exists at a position higher than the lower end 122 of the second taper seal 118, it can be ensured that the first filling ratio F1 of the first taper seal 114 is within a range between x1 and x2. Thus, the height of the first gas-liquid interface 116 can be set within a desired range without directly measuring the height of the first gas-liquid interface 116. As a result, it is unnecessary to configure the rotary device 100 such that the height of the first gas-liquid interface 116 can be measured so that the degree of freedom in design is improved. Specifically, even when the first gas-liquid interface 116 of the first taper seal 114 is hard to be seen, the heights of the first gas-liquid interface 116 and the second gas-liquid interface 120 can be grasped so that a life time of the product can be ensured. Further, a step of measuring the height of the first gas-liquid interface 116 can be omitted to improve production efficiency.

Further, according to the rotary device 100 of the embodiment, it is ensured that the first gas-liquid interface 116 exists in the second taper portion 114b and does not exceed the upper end 134 of the second taper portion 114b even when the second gas-liquid interface 120 reaches the upper end 132 of the second taper seal 118. Thus, spill out of the lubricant 92 from the first taper seal 114 can be suppressed.

Second Embodiment

Figure 7:
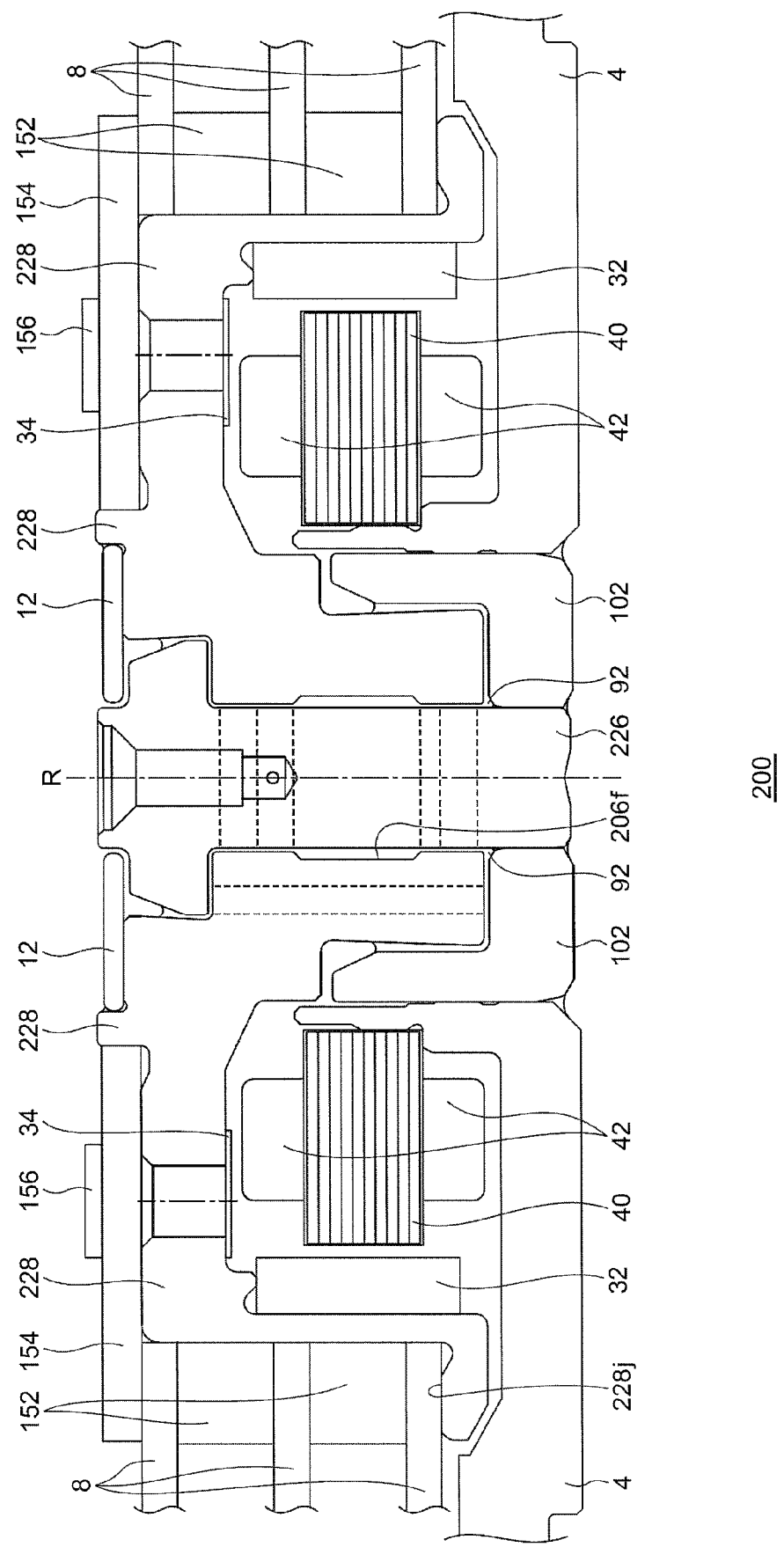
FIG. 7 is a cross-sectional view illustrating an example of the rotary device of a second embodiment.

FIG. 7 is a cross-sectional view illustrating an example of a rotary device 200 of a second embodiment. In the rotary device 100 of the first embodiment, the overhang surrounding portion 104 and the shaft 26 are separately formed. However, in the rotary device 200 of the second embodiment, the overhang surrounding portion and the shaft are integrally formed as a shaft 226. Further, in the rotary device 100 of the first embodiment, the sleeve 106 and the hub 28 are separately formed. However, in the rotary device 200 of the second embodiment, the sleeve and the hub are integrally formed as a hub 228.

According to the rotary device 200 of the embodiment, the same advantages as those of the rotary device 100 of the first embodiment can be obtained. In addition, accuracy of runout, in other words, accuracy of processing or dimensional accuracy, between a disk mounting surface 228j and a sleeve inner circumferential surface 206f of the hub 228 is improved.

Third Embodiment

FIG. 8 is a cross-sectional view illustrating an example of a rotary device 300 of a third embodiment.

In this embodiment, the rotary body includes a hub 328, a cylindrical magnet 332 and an outer surrounding member 306. The fixed body includes a base 304, a stacked core 340, coils 342, a housing 302, a shaft 326, an attraction plate 386. There exists lubricant 392 at a part of the space between the rotary body and the fixed body in a continuous manner.

Similar to the first embodiment, magnetic recording disks (not shown in the drawings) are mounted on a disk mounting surface 328a of the hub 328. The hub 328 includes a cylindrical shaft surrounding portion 328b that surrounds the periphery of the shaft 326. The shaft surrounding portion 328b is provided with a radial dynamic pressure generation groove at an inner circumferential surface 328c.

The cylindrical magnet 332 is attached to a cylindrical inner circumferential surface 328f of the hub 328 by bonding. An inner circumferential surface of the cylindrical magnet 332 faces 12 salient poles of the stacked core 340 in the radial direction. The cylindrical magnet 332 is polarized to have 16 poles for driving in the circumferential direction.

The stacked core 340 includes an annular portion and 12 salient poles that extend outwardly from the annular portion in the radial direction and is fixed to an upper surface side of the base 304. The stacked core 340 is formed by stacking 10 thin electromagnet steel plates and formed to be in an integral body by caulking. Each of the coils 342 is wound around the respective salient pole of the stacked core 340.

The base 304 is provided with a through hole 304h whose center is the rotational axis R of the rotary body. The housing 302 has a substantially L shape in a cross-sectional view and is attached to the base 304 in the through hole 304h by bonding. The housing 302 surrounds the periphery of the lower portion of the shaft 326. This means that the housing 302 is provided with a shaft hole 302a whose center is the rotational axis R of the rotary body, and the lower portion of the shaft 326 is inserted into the shaft hole 302a and fixed therein by bonding or tight fitting. The housing 302 includes a cylindrical barrel portion 302b that surrounds the periphery of the lower portion of the shaft surrounding portion 328b.

The outer surrounding member 306 is a cylindrical member that surrounds the periphery of the barrel portion 302b and is fixed to the hub 328. A first taper seal 310 is formed between the outer surrounding member 306 and the barrel portion 302b. The first taper seal 310 is configured such that a space between the inner circumferential surface 306a of the outer surrounding member 306 and the outer circumferential surface 302c of the barrel portion 302b becomes gradually larger downwardly. The first taper seal 310 has a first gas-liquid interface 312 of the lubricant 392 and suppresses leakage of the lubricant 392 by a capillary action.

The base 304 includes a cylindrical protruding portion 304e whose center is the rotational axis R of the rotary body. The protruding portion 304e is formed to be protruded from the upper surface of the base 304 to surround the periphery of the outer surrounding member 306. The stacked core 340 is fixed to the base 304 when the center hole of the annular portion of the stacked core 340 engages the outer circumferential surface of the protruding portion 304e. The protruding portion 304e and the outer surrounding member 306 forms a labyrinth seal for the lubricant 392 that is evaporated from the first gas-liquid interface 312.

The shaft 326 includes an overhang portion 326a that is formed at the upper end side of the shaft 326 and overhung outwardly in the radial direction. A second taper seal 314 is formed between the overhang portion 326a and the shaft surrounding portion 328b. A second gas-liquid interface 316 of the lubricant 392 is positioned above the second taper seal 314 in the space between the overhang portion 326a and the shaft surrounding portion 328b.

The relationship between the filling ratio of the first taper seal 310 and the filling ratio of the space between the overhang portion 326a and the shaft surrounding portion 328b (second taper seal 314) are the same as that in the first embodiment.

Specifically, the first taper seal 310 includes a first taper portion and a second taper portion similar to the first embodiment. In the first taper portion, a space between the housing 302 and the outer surrounding member 306 becomes larger downwardly by a predetermined first proportion while in the second taper portion, a space between the housing 302 and the outer surrounding member 306 becomes larger downwardly by a second proportion, which is larger than the first proportion.

The rotary device 300 includes a first radial dynamic pressure generator 360 and a second radial dynamic pressure generator 362 each generates dynamic pressure in the radial direction in the lubricant 392 when the rotary body is rotated, in the space between the inner circumferential surface 328c of the shaft surrounding portion 328b and the corresponding circumferential surface 326b of the shaft 326. The first radial dynamic pressure generator 360 and the second radial dynamic pressure generator 362 are separated from each other in the axial direction where the first radial dynamic pressure generator 360 is positioned above the second radial dynamic pressure generator 362. The inner circumferential surface 328c of the shaft surrounding portion 328b is provided with a first radial dynamic pressure generation groove and a second radial dynamic pressure generation groove, each having a herringbone shape or a spiral shape (not shown in the drawings) at positions corresponding to the first radial dynamic pressure generator 360 and the second radial dynamic pressure generator 362, respectively. Here, at least one of the first radial dynamic pressure generation groove and the second radial dynamic pressure generation groove may be provided at the circumferential surface 326b of the shaft 326 instead of the inner circumferential surface 328c of the shaft surrounding portion 328b.

The rotary device 300 includes a thrust dynamic pressure generator 364 that generates dynamic pressure in the axial direction in the lubricant 392 when the rotary body is rotated, in the space between the upper surface 302d of the barrel portion 302b and the lower surface 328d of the shaft surrounding portion 328b. The dynamic pressure generated in the thrust dynamic pressure generator 364 applies an upward force in the axial direction to the hub 328. The lower surface 328d of the shaft surrounding portion 328b at the position corresponding to the thrust dynamic pressure generator 364 is provided with a thrust dynamic pressure generation groove (not shown in the drawings) having a herringbone shape or a spiral shape. The thrust dynamic pressure generation groove may be formed at the upper surface 302d of the barrel portion 302b instead of the lower surface 328d of the shaft surrounding portion 328b.

The attraction plate 386 is fixed to the upper surface of the base 304 by caulking or by bonding to face the cylindrical magnet 332 in the axial direction. As the attraction plate 386 is made of magnetic material, the attraction plate 386 and the cylindrical magnet 332 attract each other by a magnetic force. With this, a force in the lower axial direction is applied to the cylindrical magnet 332 to suppress the floating of the rotary body while being rotated.

When the rotary body is rotated, the first radial dynamic pressure generation groove, the second radial dynamic pressure generation groove and the thrust dynamic pressure generation groove respectively generate dynamic pressure to the lubricant 392. By these dynamic pressures, the rotary body is supported in the radial direction and in the axial direction without directly contacting the fixed body. The distance between the attraction plate 386 and the cylindrical magnet 332 and the magnetic force of the attraction plate 386 are designed such that the attraction force by the attraction plate 386 to attract the cylindrical magnet 332 corresponds to the thrust dynamic pressure generated at the thrust dynamic pressure generator 364. Specifically, the distance between the attraction plate 386 and the cylindrical magnet 332 and the magnetic force of the attraction plate 386 are designed such that the floating amount of the rotary body becomes within a desired range when the rotary body is rotated.

The space between the rotary body and the fixed body includes the thrust dynamic pressure generator 364, the second radial dynamic pressure generator 362 and the first radial dynamic pressure generator 360 in this order in the path of the lubricant 392 from the first taper seal 310 to the second taper seal 314.

The shaft surrounding portion 328b is provided with a communication hole 370 that is formed to connect a portion between the first radial dynamic pressure generator 360 and the second radial dynamic pressure generator 362, and a portion between the second radial dynamic pressure generator 362 and the thrust dynamic pressure generator 364. The communication hole 370 bypasses the second radial dynamic pressure generator 362. The communication hole 370 is formed as a straight through hole. The shaft surrounding portion 328b is further provided with a bypass path 372 that bypasses the first radial dynamic pressure generator 360, the second radial dynamic pressure generator 362 and the thrust dynamic pressure generator 364. The bypass path 372 is formed as a straight through hole.

According to the rotary device 300 of the third embodiment, the attraction plate 386 is provided in order to obtain a necessary lower side force in the axial direction for stabilizing the floating amount of the rotary body when the rotary body is rotated, instead of providing another thrust dynamic pressure generator. Thus, it is not necessary to provide such another thrust dynamic pressure generator, thus, the number of process steps and the difficulties in processing can be reduced. Specifically, as relatively higher process accuracy is required for forming a dynamic pressure generator while such higher process accuracy is not required in providing the attraction plate, the number of process steps or the difficulties in processing can be reduced to improve the production efficiency.

Further, the center of gravity of the rotary body can be positioned between the first radial dynamic pressure generator 360 and the second radial dynamic pressure generator 362, in other words, within the bearing span and the stable rotation can be performed.

Further, according to the rotary device 300 of the third embodiment, the pressure gradient of the lubricant 392 within the bearing can be reduced by the functions to average the pressure by the communication hole 370 and the bypass path 372, and leakage of the lubricant 392 can be suppressed.

Further, according to the rotary device 300 of the third embodiment, the lower portion of the shaft surrounding portion 328b is interposed between the thrust dynamic pressure generator 364 and the shaft 326. Thus, the thrust dynamic pressure generator 364 can be positioned relatively outside in the radial direction. As a result, rigidity of the bearing is improved and the stability when the rotary body is rotated can be increased.

Further, according to the rotary device 300 of the third embodiment, the pressure of the lubricant 392 can be gathered to a thrust surface portion 374, which is downstream of the second radial dynamic pressure generator 362 when seen from the second taper seal 314 side. Thus, a pump-in force is generated in a direction opposite to the attraction force by the attraction plate 386. With this configuration, sufficient floating amount can be retained when the rotary body is rotated. This effect can be increased as the number of the magnetic recording disks increases to 3, 4, 5 and more.

Further, according to the rotary device 300 of the third embodiment, it is not necessary to form an additional thrust dynamic pressure generator near the second taper seal 314. Thus, the second taper seal 314 can be made to be relatively compact. With this, the bearing span can be enlarged for an amount that the second taper seal 314 is made to be compact in the axial direction.

Further, according to the rotary device 300 of the third embodiment, the overhang portion 326a functions as a stopper to stop the hub 328 from slipping from the shaft 326 by protruding in the radial direction.

Fourth Embodiment

FIG. 9 is a cross-sectional view illustrating an example of a rotary device 400 of a fourth embodiment. The rotary body includes a hub 428, the cylindrical magnet 32, the cap 12 and a clamper 154. The fixed body includes the base 4, the stacked core 40, the coils 42, a periphery wall member 402, the shaft 426, the overhang surrounding portion 104 and an insulating tape 494. There exists lubricant 492 at a part of the space between the rotary body and the fixed body in a continuous manner.

The hub 428 includes a shaft surrounding portion 428a that surrounds the periphery of the shaft 426, a hub protruding portion 428b that is inserted in the center holes of the magnetic recording disks 8, respectively, and a mounting portion 428c that is provided outside of the hub protruding portion 428b in the radial direction. The magnetic recording disks 8 are mounted on a disk mounting surface 428j, which is an upper surface of the mounting portion 428c.

The clamp screws 156 are screwed with clamp screw holes 428m provided at the hub protruding portion 428b, respectively. The protruding portion 4e of the base 4 protrudes upward from the upper surface of the base 4 to surround the periphery wall member 402. The base 4 is provided with an insulating tape 494, which aids insulating the base 4 from the coils 42, is attached at the upper surface of the base 4 at a portion facing the coils 42 in the axial direction.

The shaft 426 includes a cylinder rod portion 426a that extends in the rotational axis R and a flat circular flange portion 426b that protrudes outward in the radial direction from the lower end of the rod portion 426a. The rod portion 426a is be formed by cutting, grinding and quenching. The flange portion 426b is formed by cutting. The flange portion 426b may be performed with grinding.

The periphery wall member 402 is a cylindrical member and fixed to the inner circumferential surface of the protruding portion 4e, in other words the bearing hole 4h, by bonding. The periphery wall member 402 is fixed to an outer periphery end of the flange portion 426b. The periphery wall member 402 and the flange portion 426b are connected by one of or a combination of either of bonding, press fitting, welding and caulking. When considering a leakage of the lubricant 492, the periphery wall member 402 and the flange portion 426b may be connected by bonding.

The thickness T3 of the periphery wall member 402 in the radial direction is larger than the thickness T4 of the protruding portion 4e at a portion facing the center hole of the stacked core 40 in the radial direction.

The first taper seal 414, the first thrust dynamic pressure generator 464, the second radial dynamic pressure generator 462, the first radial dynamic pressure generator 460, the second thrust dynamic pressure generator 466 and the second taper seal 418 of the rotary device 400 of the fourth embodiment correspond to the first taper seal 114, the first thrust dynamic pressure generator 164, the second radial dynamic pressure generator 162, the first radial dynamic pressure generator 160, the second thrust dynamic pressure generator 166 and the second taper seal 118 of the rotary device 100 of the first embodiment, respectively.

The shaft surrounding portion 428a is provided with a bypass connection hole 468 that bypasses the first radial dynamic pressure generator 460 and the second radial dynamic pressure generator 462.

There is provided a sixth space 482, having a reverse L shape in a cross-sectional view, between an upper portion of the periphery wall member 402 and the hub 428 at an upper side of the first taper seal 414. The sixth space 482 functions as a labyrinth for the lubricant 492 evaporated from the first gas-liquid interface 416 of the first taper seal 414 to reduce the evaporated amount of the lubricant 492.

The thickness T1 of the flange portion 426b at a portion corresponding to the first thrust dynamic pressure generator 464, in other words, a portion at a lower side of the first thrust dynamic pressure generator 464 in the axial direction, is smaller than the thickness T2 of the base 4 at a portion facing the coils 42 in the axial direction.

The inner circumferential surface 402a of the periphery wall member 402 is provided with a circular periphery wall concave portion 402b in the vicinity of an exit of the first taper seal 414. The outer circumferential surface 428d that faces the periphery wall member 402 is provided with an opposing concave portion 428e at a position facing the periphery wall concave portion 402b of the shaft surrounding portion 428a in the radial direction. A lipophobic material that repels the lubricant 492 is coated at exit sides of the periphery wall concave portion 402b and the opposing concave portion 428e, respectively.

According to the rotary device 400 of the embodiment, as the rod portion 426a and the flange portion 426b are integrally formed as the shaft 426, the length in the axial direction can be shortened while maintaining the strength at the connected portion between the rod portion 426a and the flange portion 426b.

If the rod portion and the flange portion are separately formed, it is necessary to provide the connected portion of the rod portion and the flange portion, in other words, an overlapping range in the axial direction, to be relatively long. In this embodiment, as the rod portion 426a and the flange portion 426b are integrally formed, a sufficient bonding strength can be obtained even when the overlapping range is relatively short. As a result, the distance between the first radial dynamic pressure generator 460 and the second radial dynamic pressure generator 462, in other words, the bearing span can be enlarged, for the amount that the length of the connected portion is shortened, to increase the rigidity of the bearing.

Further, by separately forming the shaft 426 and the periphery wall member 402 while integrally forming the rod portion 426a and the flange portion 426b, the flange portion 426b can be easily positioned perpendicularly with respect to the rod portion 426a. Thus, the perpendicularity between the upper surface of the flange portion 426b that forms the first thrust dynamic pressure generator 464 and the circumferential surface of the rod portion 426a that forms the first radial dynamic pressure generator 460 and the second radial dynamic pressure generator 462 can be improved.

Fifth Embodiment

FIG. 10 is a cross-sectional view of the rotary device 500 of a fifth embodiment. The rotary body includes a hub 528, a cylindrical magnet 32, a cap 12 and a clamper 154. The fixed body includes the base 4, the stacked core 40, the coil 42, a housing 502, a shaft 526, an overhang surrounding portion 504 and an insulating tape 494. There exists lubricant 592 at a part of the space between the rotary body and the fixed body in a continuous manner.

The hub 528 includes a shaft surrounding portion 528a that surrounds the periphery of the shaft 526, a hub protruding portion 528b that engages the center holes of the magnetic recording disks 8, and a mounting portion 528c provided further outside than the hub protruding portion 528b in the radial direction. The magnetic recording disks 8 are mounted on a disk mounting surface 528j, which is the upper surface of the mounting portion 528c.

The clamp screws 156 are screwed with the clamp screw holes 528m provided at the hub protruding portion 528b, respectively.

The protruding portion 4e of the base 4 is protruded from the upper surface of the base 4 to surround the periphery of the housing 502.

The housing 502 includes a flat circular housing bottom portion 510, a cylindrical base side surrounding portion 512 fixed to an outer periphery side of the housing bottom portion 510 and a cylindrical support protruding portion 508 fixed to an inner periphery side of the housing bottom portion 510. The housing 502 supports the shaft 526.

The housing bottom portion 510 and the base side surrounding portion 512 are formed such that an outer circumferential surface of the housing bottom portion 510 contacts an inner circumferential surface of the base side surrounding portion 512 at its lower side portion. Specifically, the housing bottom portion 510 and the base side surrounding portion 512 are integrally formed. The housing bottom portion 510 and the support protruding portion 508 are formed such that an inner circumferential surface of the housing bottom portion 510 contacts an outer circumferential surface of the support protruding portion 508 at a lower side. Specifically, the housing bottom portion 510 and the support protruding portion 508 are integrally formed. The base side surrounding portion 512 is fixed to the bearing hole 4h provided in the base 4 by bonding.

The shaft 526 is provided with a support hole 526d at its lower end surface 526c along the axial direction. The support protruding portion 508 is inserted in the support hole 526d and is fixed therein. The shaft 526 includes a rod portion 526b that extends along the rotational axis R, and an overhang portion 526a that is provided at the upper end side of the rod portion 526b and outwardly protrudes in the radial direction.

The overhang surrounding portion 504 surrounds the periphery of the overhang portion 526a and is fixed to the overhang portion 526a. The overhang surrounding portion 504 is fixed to the overhang portion 526a by a combination of bonding and press fitting. Alternatively, the overhang surrounding portion 504 may be fixed to the overhang portion 526a by welding. For this case, a curing resin may be coated on a surface of the welded portion. With such a structure, the deposited material can be prevented from pealing from the surface of the welded portion.

The first taper seal 514, the first thrust dynamic pressure generator 564, the second radial dynamic pressure generator 562, the first radial dynamic pressure generator 560 and the second thrust dynamic pressure generator 566 of the rotary device 500 of the fifth embodiment correspond to the first taper seal 414, the first thrust dynamic pressure generator 464, the second radial dynamic pressure generator 462, the first radial dynamic pressure generator 460 and the second thrust dynamic pressure generator 466 of the rotary device 400 of the fourth embodiment, respectively.

The shaft surrounding portion 528 is provided with a bypass connection hole 568 that bypasses the first radial dynamic pressure generator 560 and the second radial dynamic pressure generator 562. There is provided a space, having a reverse L shape in a cross-sectional view, between an upper portion of the base side surrounding portion 512 and the hub 528. The space functions as a labyrinth, similar to the sixth space 482 explained in the fourth embodiment.

In the fifth embodiment, the minimum space between the overhang surrounding portion 504 and the hub 528 in the axial direction is made larger than the minimum space between the overhang portion 526a and the hub 528 in the axial direction. Even when the hub 528 is moved in a direction away from the base 4, the movement of the hub 528 is regulated by colliding with the overhang portion 526a so that the overhang surrounding portion 504 can be maintained not to be in contact with the hub 528. With this configuration, even when the rotary device 500 is applied with a shock, the hub 528 may collide with the overhang portion 526a, however, the hub 528 does not collide with the overhang surrounding portion 504. Thus, the possibility that a connected portion of the overhang surrounding portion 504 and the overhang portion 526a is deformed can be decreased.

The space between the outer circumferential surface 504a of the overhang surrounding portion 504 and a surface of the hub 528 that faces the outer circumferential surface 504a in the radial direction gradually expands upwardly to form the second taper seal 518. The second taper seal 518 is configured such that a second gas-liquid interface 520 of the lubricant 592 exists when the rotary device 500 is being operated.

There is provided a constriction portion in which the space between the overhang surrounding portion 504 and the hub 528 gradually decreases toward the second thrust dynamic pressure generator 566 is provided between the second taper seal 518 and the second thrust dynamic pressure generator 566 in the path of the lubricant 592. In the constriction portion 572, the space becomes narrower as approaching the upper side (as being close to the shaft 526). With this, the lubricant 592 is further prevented from leaking in addition to the function of the second taper seal 518.

When the shaft 526 and the support protruding portion 508 are integrally formed, the shape of such an integrally formed member becomes relatively complicated and it is difficult to accurately manufacture such an integrally formed member. For example, it may be difficult to introduce a grinder to grind a circumferential surface of the shaft. As the circumferential surface of the shaft corresponds to the radial dynamic pressure generator, a relatively high dimensional accuracy is required. On the other hand, according to the rotary device 500 of the embodiment, the shaft 526 and the support protruding portion 508 are separately formed. Thus, the circumferential surface of the shaft 526 can be manufactured with a high dimensional accuracy while fixing the base 4 to the shaft 526.

Further, if the support protruding portion 508 is separately formed in the housing 502, the connected portion of the support protruding portion 508 and the housing bottom portion 510 may be formed in a relatively large scale in order to fix then with a sufficient fixing strength. In such a case, the rotary device 500 cannot be made thinner. Thus, according to the rotary device 500 of the embodiment, the support protruding portion 508 is integrally formed with the housing bottom portion 510.

According to the rotary device 500 of the embodiment, the rod portion 526b and the overhang portion 526a are integrally formed as the shaft 526. Thus, the connected portion of the overhang portion 526a and the rod portion 526b can be formed to be shorter in the axial direction while maintaining the strength in connection.

If the rod portion and the overhang portion are separately formed, it is necessary to provide the connected portion of the rod portion and the overhang portion, in other words, an overlapping range in the axial direction, to be relatively long in order to connect then with a sufficient strength. However, in this embodiment, as the rod portion 526b and the overhang portion 526a are integrally formed, a sufficient bonding strength can be obtained even when the overlapping range is made relatively small. As a result, the distance between the first radial dynamic pressure generator 560 and the second radial dynamic pressure generator 562, in other words, the bearing span can be enlarged, for the amount that the length of the connected portion is shortened, to increase the rigidity of the bearing.

Although a preferred embodiment of the rotary device has been specifically illustrated and described, it is to be understood that minor modifications may be made therein without departing from the spirit and scope of the invention as defined by the claims.

The present invention is not limited to the specifically disclosed embodiments, and variations and modifications may be made without departing from the scope of the present invention.

In the first to fifth embodiments, a so-called outer rotor type rotary device in which the cylindrical magnet positions outside the stacked core is explained. However, teachings herein are not so-limited. For example, a so-called inner rotor type rotary device in which the cylindrical magnet is positioned inside the stacked core may be used, for example.

In the first to fifth embodiments, an example in which the housing is directly attached to the base is explained. However, teachings herein are not so-limited. For example, a structure may be obtained by preparing a brushless motor including the rotary body and the fixed body, and then attaching the brushless motor to a chassis.

In the first to fifth embodiments, examples in which the stacked core is used are explained. However, the core may not be the stacked core.

In the first embodiment, an example in which the base 4 is formed by shaping aluminum alloy by the die-cast is explained. However, it is not limited so and the base 4 may be formed by press working on a metal plate such as an aluminum plate, an iron plate or the like. At this time, the base 4 may be formed to have an emboss portion including a protruding portion at one surface and a concave portion at the other surface corresponding to the concave portion by pressing up the base 4. By providing the emboss portion at a predetermined position, deformation of the base 4 can be suppressed. Further, at this time, the base 4 may be applied with a surface treatment such as plating, resin coating or the like. For example, when the base 4 is made of an iron plate, a nickel plating layer and a surface layer of epoxy resin may be provided after performing press working.

The base 4 may be configured by a combination of a sheet metal portion that is formed by performing press working on a metal plate such as an aluminum plate, an iron plate or the like, and a die-cast portion that is formed by shaping the aluminum alloy or the like by the die-cast. For example, the bottom plate portion 4a may be configured by the sheet metal portion while the outside periphery wall portion 4b may be configured by the die-cast portion. With this structure, lowering of the rigidity of the screw holes 22 can be suppressed. A method of manufacturing such a base 4 may be, a die-cast portion is formed by shaping the aluminum alloy or the like by an aluminum die-cast while a previously formed sheet metal portion is placed in the aluminum die-cast. According to the method, it is not necessary to connect the sheet metal portion and the die-cast portion and the dimensional accuracy of the sheet metal portion and the die-cast portion can be improved. Further, members for connecting the sheet metal portion and the die-cast portion can be made small or omitted. As a result, the base 4 can be formed to be thinner.

In the first embodiment, the cap 12 is formed to extend in the direction. However, teachings herein are not so-limited. For example, the cap 12 may be formed by a portion that extends in the radial direction and a portion that extends in the axial direction. By narrowing the space between the cap 12 and the fixed body in the radial direction, the diffusion if the steam of the lubricant 92 can be further reduced.

In the first embodiment, a case in which the overhang surrounding portion 104 is fixed to the shaft 26 by bonding, press fitting and bonding, or the like is explained. However, teachings herein are not so-limited. For example, the overhang surrounding portion 104 may be fixed to the shaft 26 by welding. At this time, the bonding strength can be increased and the resistance against shock can be improved. Further, as the bonding strength similar to that obtained when bonding is used can be obtained even when the length of the connected portion is short and the rotary device can be made thinner. This structure can be adoptable for other connected portions such as the connected portion between the hub 28 and the sleeve 106, the connected portion between the cap 12 and the hub, the connected portion between the sleeve surrounding portion 112 and the base 4 or the like. When such a structure is provided, the same advantage as described above can be obtained.

When parts are connected by welding, there is a possibility that a removable contaminant is attached to a welded portion. Thus, a surface coat cover may be provided at the surface of the welded portion in order to prevent pealing of such a contaminant. The surface coat cover may be formed by, for example, coating a liquid resin at a surface of the welded portion, and curing the liquid resin by heating or by UV. Further, bonding or press filling and bonding may be combined with welding for such a connected portion. For example, welding is partially performed while bonding or press fitting and bonding is partially performed at other parts. In such a case, as a certain bonding strength can be obtained by a portion where welding is adopted, deformation of the bonding part by a shrinkage on curing of the adhesive material can be suppressed.

In the first embodiment, an example in which each of the taper seals and the taper portions is defined by a proportion by which the respective space becomes larger is explained, however, this is not limited so. For example, each of the taper seals and the taper portions may be defined by a radius of curvature of the respective gas-liquid interface.

Specifically, it is assumed that a radius of curvature of the second gas-liquid interface 120 at the lower end 122 of the second taper seal 118 is "r1", a radius of curvature of the second gas-liquid interface 120 at a position upper than the position 130 in the second taper seal 118 is "r4", and a radius of curvature of the second gas-liquid interface 120 at the upper end 132 of the second taper seal 118 is "r5". Further, it is assumed that a radius of curvature of the first gas-liquid interface 116 at the lower end 124 of the first taper portion 114a is "r2", a radius of curvature of the first gas-liquid interface 116 at the upper end 128 of the first taper portion 114a is "r3", and a radius of curvature of the first gas-liquid interface 116 at the upper end 134 of the second taper portion 114b is "r6". At this time, the first taper seal 114 and the second taper seal 118 may be formed to satisfy the following condition: r1<r2<r3<r4<r5<r6.

In the first embodiment, a case where x1 is smaller than TV3/TV1 is explained, however, this is not limited so. For example, x1 may be set substantially equal to TV3/TV1. In other words, the first taper seal 114 and the second taper seal 118 may be formed such that the lower limit of the second filling ratio F2 corresponds to a range, 0 (the lower limit) ≤F1≤TV3/TV1, of the first filling ratio F1, in other words, the first taper portion 114a. At this time, by setting the volume TV3 of the first taper portion 114a to be larger than or equal to the minimum value of the lubricant 92 for which the first taper seal 114 is to include, it is easier to retain such a minimum amount of the lubricant 92 in the first taper seal 114.

In the third embodiment, an example in which the communication hole 370 and the bypass path 372 are provided in the shaft surrounding portion 328b is explained. However, this is not limited so, and at least one of the communication hole 370 and the bypass path 372 may be provided in the shaft surrounding portion.

In the first to fifth embodiments, an example in which both end surfaces of the cap have flat surfaces, respectively. However, teachings herein are not so-limited. Both end surfaces of the cap may be provided with a protruding portion or a concave portion. For example, the cap 12 may be provided with a periphery protruding portion or a concave portion at a surface near the base 4. By providing the protruding portion or the concave portion, it is easier to recognize front and back surfaces of the cap 12 and it is easier to attach the cap 12 in a proper side.

According to the embodiments, production efficiency of the shaft fixed type rotary device can be improved.

The present application is based on and claims the benefit of priority of Japanese Priority Application No. 2012-184302 filed on Aug. 23, 2012, the entire contents of which are hereby incorporated by reference.

What is claimed is:

1. A rotary device comprising:
a fixed body that includes a shaft;
a rotary body that includes a sleeve being configured to surround a periphery of the shaft through lubricant; and
a first taper seal and a second taper seal provided in a space between the fixed body and the rotary body in which gas-liquid interfaces of the lubricant exist, respectively, when the rotary device is operated,
the first taper seal and the second taper seal being configured such that
a lower limit of a filling ratio, which is a ratio of the volume of the lubricant filled in a taper seal with respect to the volume of the respective taper seal, of the second taper seal corresponds to a predetermined range of the filling ratio of the first taper seal including a lower limit of the filling ratio of the first taper seal, and
an upper limit of the filling ratio of the second taper seal corresponds to a predetermined filling ratio of the first taper seal that is larger than an upper limit of the predetermined range and lower than an upper limit of the first taper seal.

2. The rotary device according to claim 1, wherein
the first taper seal includes
a first taper portion in which the space becomes larger by a predetermined first proportion in a first direction of a path of the lubricant away from the second taper seal, and
a second taper portion that is positioned further from the second taper seal than the first taper portion in the first direction in which the space becomes larger by a predetermined second proportion, which is larger than the first proportion, and
the first taper seal and the second taper seal are configured such that the gas-liquid interface of the lubricant exists in the first taper portion of the first taper seal when the filling ratio of the second taper seal is at the lower limit.

3. The rotary device according to claim 2,
wherein the gas-liquid interface of the lubricant exists in the second taper portion of the first taper seal when the filling ratio of the second taper seal is at the upper limit.

4. The rotary device according to claim 2, further comprising:
a first dynamic pressure generator and a second dynamic pressure generator provided in the space between the rotary body and the fixed body in the path of the lubricant between the first taper seal and the second taper seal, respectively,
the first dynamic pressure generator and the second dynamic pressure generator being separated from each other in an axial direction,
the sleeve being provided with a communication hole that connects a portion of the first dynamic pressure generator at a side opposite to the second dynamic pressure generator and a portion of the second dynamic pressure generator at a side opposite to the first dynamic pressure generator, and
the communication hole being formed such that a ratio of the diameter of the communication hole with respect to the diameter of a surface of the sleeve facing the shaft is more than 0.13.

5. The rotary device according to claim 2, further comprising:
a radial dynamic pressure generator provided in the space between the rotary body and the fixed body that generates dynamic pressure in the lubricant in a radial direction in the path of the lubricant between the first taper seal and the second taper seal when the rotary body is rotated, and wherein
the rotary body includes a hub fixed to the sleeve and on which a recording disk is to be mounted,
one of surfaces of the hub and the sleeve at a connected portion of the hub and the sleeve being provided with a first concave portion at a first position corresponding to the radial dynamic pressure generator in the axial direction, the other of surfaces of the hub and the sleeve at the connected portion being provided with a second concave portion at a second position partially overlapping the first concave portion in the axial direction, and the one of the surfaces and the other of the surfaces being pressed to be in contact with each other at a third position opposite to the second concave portion interposing the first concave portion in the axial direction.

6. The rotary device according to claim 5,
wherein the third position does not overlap the radial dynamic pressure generator in the axial direction.

7. The rotary device according to claim 2,
wherein the second taper seal is configured such that the space becomes larger by a predetermined third proportion, which is larger than the first proportion and smaller than the second proportion, in a second direction opposite to the first direction.

8. The rotary device according to claim 1,
wherein the gas-liquid interface of the lubricant exists in the second taper portion of the first taper seal when the filling ratio of the second taper seal is at the upper limit.

9. The rotary device according to claim 1, further comprising:
a first dynamic pressure generator and a second dynamic pressure generator provided in the space between the rotary body and the fixed body in the path of the lubricant between the first taper seal and the second taper seal, respectively,
the first dynamic pressure generator and the second dynamic pressure generator being separated from each other in an axial direction,
the sleeve being provided with a communication hole that connects a portion of the first dynamic pressure generator at a side opposite to the second dynamic pressure generator and a portion of the second dynamic pressure generator at a side opposite to the first dynamic pressure generator, and
the communication hole being formed such that a ratio of the diameter of the communication hole with respect to the diameter of a surface of the sleeve facing the shaft is more than 0.13.

10. The rotary device according to claim 9, wherein
at least the first dynamic pressure generator is a radial dynamic pressure generator that generates dynamic pressure in the lubricant in a radial direction in the path of the lubricant between the first taper seal and the second taper seal when the rotary body is rotated,
the rotary body includes a hub fixed to the sleeve and on which a recording disk is to be mounted,
one of surfaces of the hub and the sleeve at a connected portion of the hub and the sleeve being provided with a first concave portion at a first position corresponding to the first radial dynamic pressure generator in the axial direction,
the other of surfaces of the hub and the sleeve at the connected portion being provided with a second concave portion at a second position partially overlapping the first concave portion in the axial direction, and
the one of the surfaces and the other of the surfaces being pressed to be in contact with each other at a third position opposite to the second concave portion interposing the first concave portion in the axial direction.

11. The rotary device according to claim 10,
wherein the third position does not overlap the first radial dynamic pressure generator in the axial direction.

12. The rotary device according to claim 10,
wherein the diameter of the one of surfaces of the hub and the sleeve at the second position is the same as that at the third position.

13. The rotary device according to claim 1, further comprising:
a radial dynamic pressure generator provided in the space between the rotary body and the fixed body that generates dynamic pressure in the lubricant in a radial direction in the path of the lubricant between the first taper seal and the second taper seal when the rotary body is rotated, and wherein
the rotary body includes a hub fixed to the sleeve and on which a recording disk is to be mounted,
one of surfaces of the hub and the sleeve at a connected portion of the hub and the sleeve being provided with a first concave portion at a first position corresponding to the radial dynamic pressure generator in the axial direction,
the other of surfaces of the hub and the sleeve at the connected portion being provided with a second concave portion at a second position partially overlapping the first concave portion in the axial direction, and
the one of the surfaces and the other of the surfaces being pressed to be in contact with each other at a third position opposite to the second concave portion interposing the first concave portion in the axial direction.

14. The rotary device according to claim 13,
wherein the third position does not overlap the radial dynamic pressure generator in the axial direction.

15. The rotary device according to claim 13,
wherein the diameter of the one of surfaces of the hub and the sleeve at the second position is the same as that at the third position.

16. The rotary device according to claim 1,
wherein the sleeve is integrally formed with a hub on which a recording disk is to be mounted.

17. The rotary device according to claim 1, further comprising:
a thrust dynamic pressure generator provided in the space between the rotary body and the fixed body that generates dynamic pressure in the lubricant in the axial direction in the path of the lubricant between the first taper seal and the second taper seal when the rotary body is rotated, and wherein
the rotary body includes
a magnet provided with a plurality of polarized poles in the circumferential direction for driving,
the fixed body includes
a core including an annular portion that surrounds a periphery of the shaft and a plurality of salient poles that are extended from the annular portion outwardly in a radial direction, the plurality of salient poles facing the plurality of polarized poles in the radial direction,
a plurality of coils wound around the plurality of salient poles, respectively, and
an attraction plate that magnetically attracts the magnet by a force in accordance with dynamic pressure generated by the thrust dynamic pressure generator.

18. The rotary device according to claim 17, further comprising:
a first radial dynamic pressure generator and a second radial dynamic pressure generator provided in the space between the rotary body, and the fixed body each of which generates dynamic pressure in the lubricant in the radial direction in the path of the lubricant, respectively, the first dynamic pressure generator, the second dynamic pressure generator and the thrust dynamic pressure generator being provided in the path of the lubricant between the first taper seal and the second taper seal in this order, and wherein the rotary body is provided with a communication hole that connects a portion between the first radial dynamic pressure generator and the second radial dynamic pressure generator and a portion between the second radial dynamic pressure generator and the thrust dynamic pressure generator.

19. The rotary device according to claim 17, further comprising:

a first radial dynamic pressure generator and a second radial dynamic pressure generator provided in the space between the rotary body and the fixed body each of which generates dynamic pressure in the lubricant in the radial direction in the path of the lubricant, respectively, the first dynamic pressure generator, the second dynamic pressure generator and the thrust dynamic pressure generator being provided in the path of the lubricant between the first taper seal and the second taper seal in this order, and wherein the rotary body is provided with a bypass path that bypasses the first radial dynamic pressure generator, the second radial dynamic pressure generator and the thrust dynamic pressure generator.

20. A rotary device comprising:

a fixed body that includes a shaft;

a rotary body that includes a sleeve being configured to surround a periphery of the shaft through lubricant; and a first taper seal and a second taper seal provided in a space between the fixed body and the rotary body in which a first gas-liquid interface and a second gas-liquid interface of the lubricant exist, respectively, when the rotary device is operated, the first taper seal including a first taper portion in which the space becomes larger by a predetermined first proportion in a first direction of a path of the lubricant away from the second taper seal, and a second taper portion that is positioned further from the second taper seal in the first direction in which the space becomes larger by a predetermined second proportion, which is larger than the first proportion, and the first taper seal and the second taper seal being configured such that the first gas-liquid interface exists in the first taper portion of the first taper seal as long as the second gas-liquid interface exists at a lower end of the second taper seal and the first gas-liquid interface of the lubricant exists in the second taper portion of the first taper seal even when the second gas-liquid interface exists at an upper end of the second taper seal.

\* \* \* \* \*